US012628186B2

(12) United States Patent
Abotabl et al.

(10) Patent No.: US 12,628,186 B2
(45) Date of Patent: May 12, 2026

(54) MULTICAST SCHEDULING IN A FULL DUPLEX NETWORK

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Le Liu, San Jose, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 17/949,001

(22) Filed: Sep. 20, 2022

(65) Prior Publication Data

US 2024/0098760 A1 Mar. 21, 2024

(51) Int. Cl.
| | |
|---|---|
| *H04W 72/30* | (2023.01) |
| *H04L 5/14* | (2006.01) |
| *H04W 72/0453* | (2023.01) |
| *H04W 72/20* | (2023.01) |

(52) U.S. Cl.
CPC .............. *H04W 72/30* (2023.01); *H04L 5/14* (2013.01); *H04W 72/0453* (2013.01); *H04W 72/20* (2023.01)

(58) Field of Classification Search
CPC ......... H04W 4/06; H04W 8/24; H04W 24/08; H04W 24/10; H04W 72/20; H04W 72/30; H04W 72/121; H04W 72/0453
See application file for complete search history.

(56) References Cited

U.S. PATENT DOCUMENTS

| | | | | |
|---|---|---|---|---|
| 2022/0231818 A1* | 7/2022 | Lee | ........................ | H04L 5/0098 |
| 2022/0286818 A1* | 9/2022 | Chin | ........................ | H04W 4/06 |
| 2022/0360360 A1* | 11/2022 | Awadin | .................... | H04W 8/24 |
| 2024/0008015 A1* | 1/2024 | Awad | .................... | H04W 72/30 |
| 2024/0057114 A1* | 2/2024 | Lei | ...................... | H04W 72/121 |
| 2024/0147428 A1* | 5/2024 | Shi | .................... | H04W 72/0446 |
| 2024/0323733 A1* | 9/2024 | Shrivastava | .......... | H04W 24/10 |
| 2025/0063579 A1* | 2/2025 | Mu | ........................ | H04W 24/08 |

* cited by examiner

*Primary Examiner* — Michael Thier
*Assistant Examiner* — Prince A Mensah
(74) *Attorney, Agent, or Firm* — QUALCOMM Incorporated

(57) ABSTRACT

Methods, systems, and devices for wireless communications are described. Techniques described herein relate to transmission of a multicast message via a common frequency resource (CFR) in a full duplex slot. The CFR may be positioned within the downlink bandwidth parts (BWP)s configured for a group of user equipments (UE)s such that each UE in the group may monitor for and receive the multicast message. The network may indicate the frequency position of the CFR to the group of UEs. The frequency resources (e.g., the resource blocks) configured for downlink for a UE may be different between half duplex slots and full duplex slots. The network and the UE may determine the active CFR for a full duplex slot based on the resources configured for the full duplex slot. The UE may monitor for and receive a multicast transmission in the active CFR in the full duplex slot.

27 Claims, 22 Drawing Sheets

205-a 205-b

200

1410

1420

1415

1405

1400

130        105        115

Network
Entity

Transceiver        Antenna 1710        1715

Communications
Manager

Memory

Code

1730

1720        1725

1740

Processor

1735

1705

1700

Figure 18:
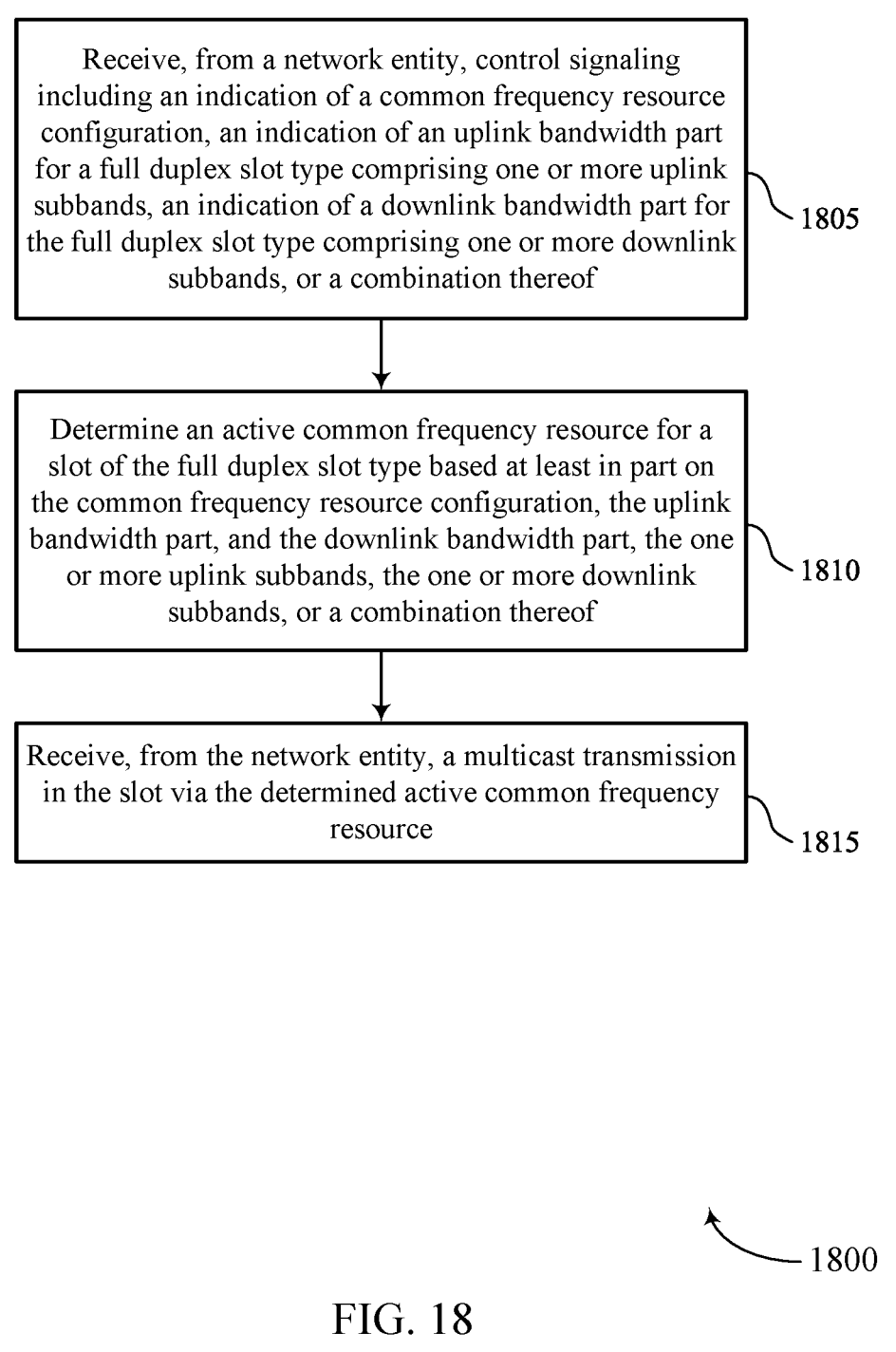

Receive, from a network entity, control signaling including an indication of a common frequency resource configuration, an indication of an uplink bandwidth part for a full duplex slot type comprising one or more uplink subbands, an indication of a downlink bandwidth part for the full duplex slot type comprising one or more downlink subbands, or a combination thereof

1805

Determine an active common frequency resource for a slot of the full duplex slot type based at least in part on the common frequency resource configuration, the uplink bandwidth part, and the downlink bandwidth part, the one or more uplink subbands, the one or more downlink subbands, or a combination thereof

1810

Receive, from the network entity, a multicast transmission in the slot via the determined active common frequency resource

Figure 19:
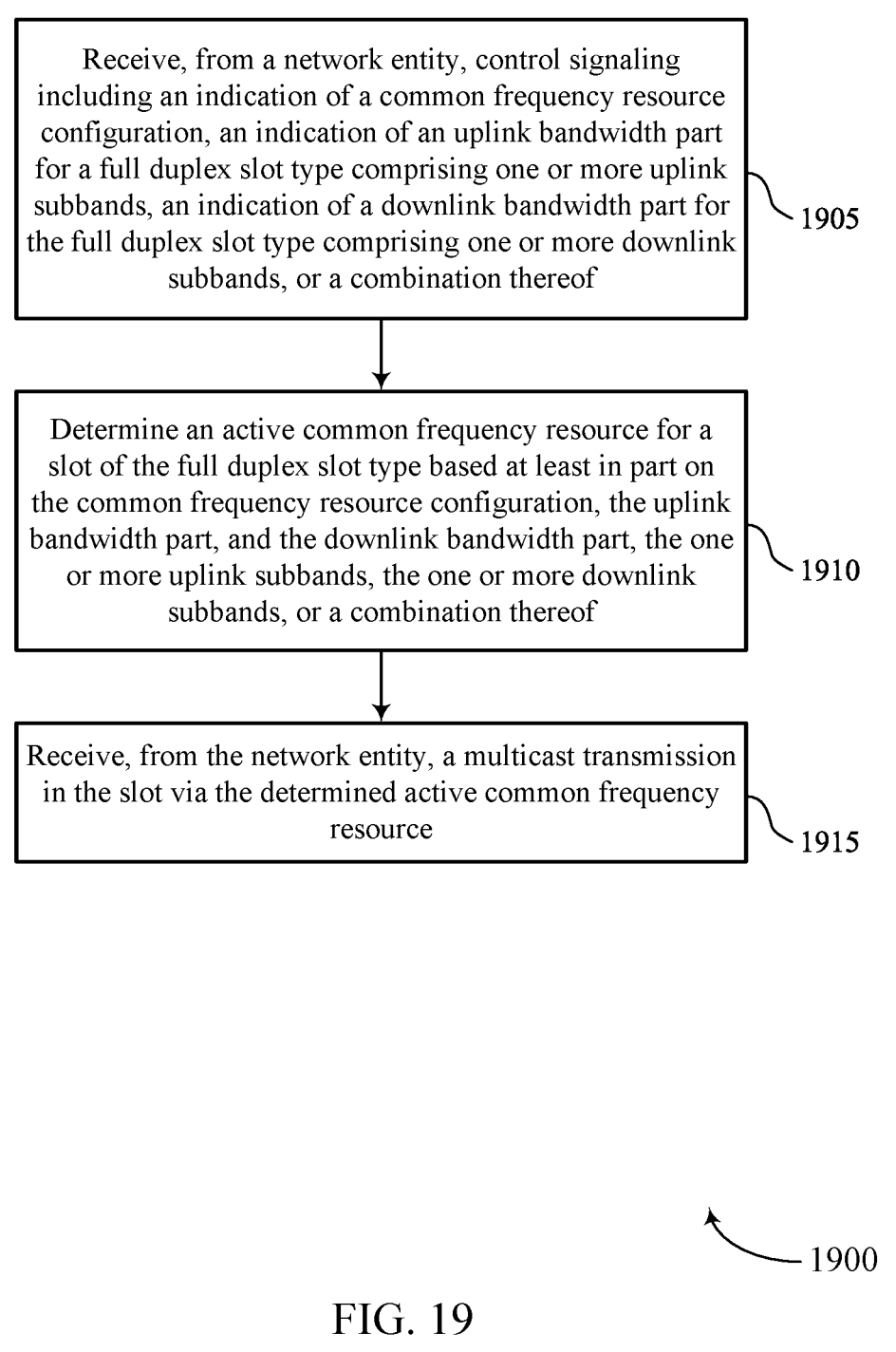

Receive, from a network entity, control signaling including an indication of a common frequency resource configuration, an indication of an uplink bandwidth part for a full duplex slot type comprising one or more uplink subbands, an indication of a downlink bandwidth part for the full duplex slot type comprising one or more downlink subbands, or a combination thereof

1905

Determine an active common frequency resource for a slot of the full duplex slot type based at least in part on the common frequency resource configuration, the uplink bandwidth part, and the downlink bandwidth part, the one or more uplink subbands, the one or more downlink subbands, or a combination thereof

1910

Receive, from the network entity, a multicast transmission in the slot via the determined active common frequency resource

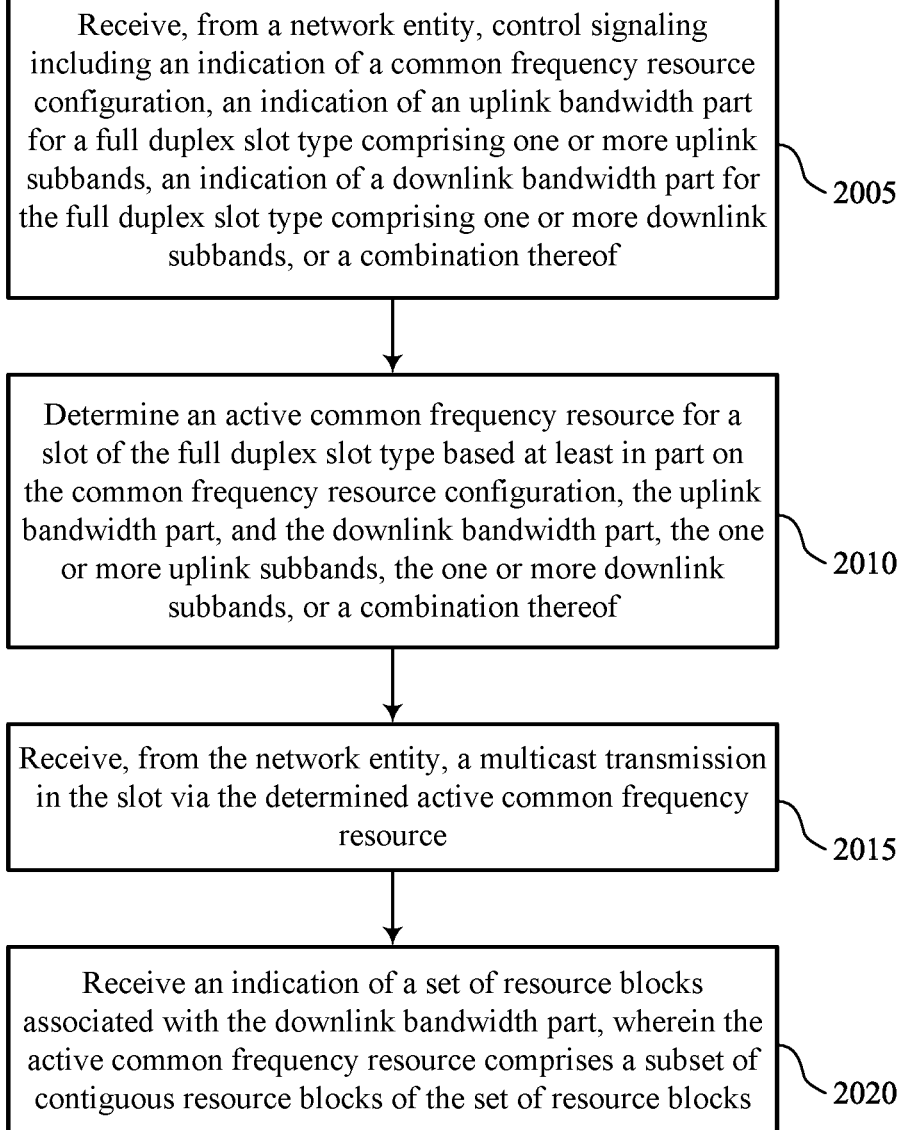

Receive, from a network entity, control signaling including an indication of a common frequency resource configuration, an indication of an uplink bandwidth part for a full duplex slot type comprising one or more uplink subbands, an indication of a downlink bandwidth part for the full duplex slot type comprising one or more downlink subbands, or a combination thereof

2005

Determine an active common frequency resource for a slot of the full duplex slot type based at least in part on the common frequency resource configuration, the uplink bandwidth part, and the downlink bandwidth part, the one or more uplink subbands, the one or more downlink subbands, or a combination thereof

2010

Receive, from the network entity, a multicast transmission in the slot via the determined active common frequency resource

2015

Receive an indication of a set of resource blocks associated with the downlink bandwidth part, wherein the active common frequency resource comprises a subset of contiguous resource blocks of the set of resource blocks

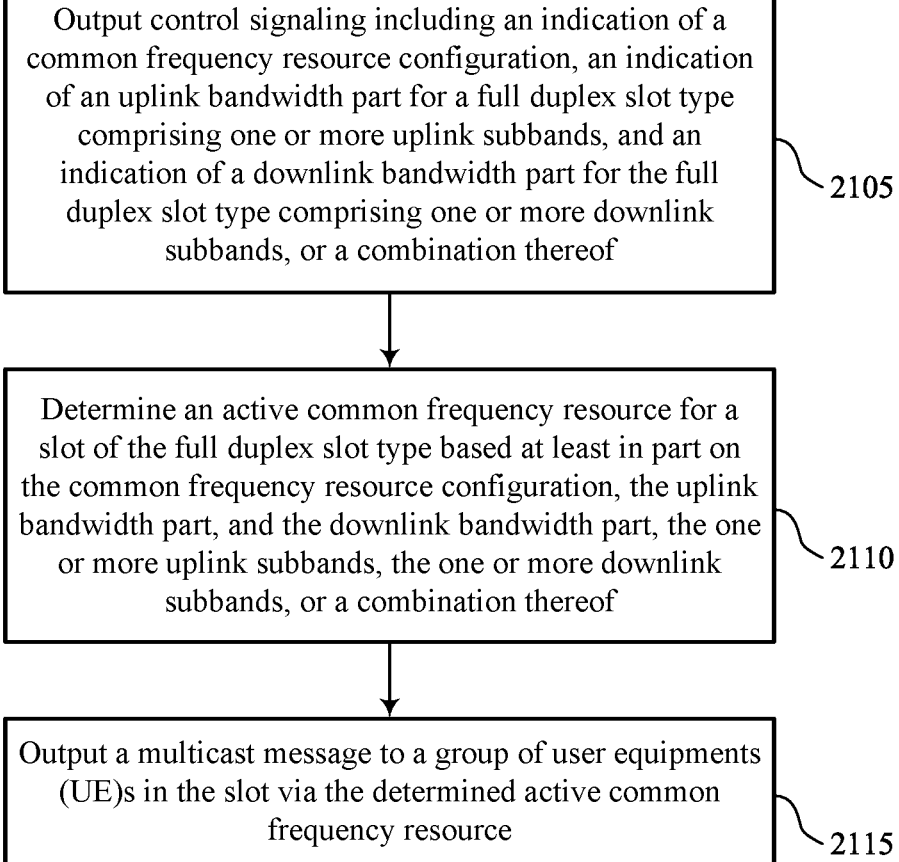

Output control signaling including an indication of a common frequency resource configuration, an indication of an uplink bandwidth part for a full duplex slot type comprising one or more uplink subbands, and an indication of a downlink bandwidth part for the full duplex slot type comprising one or more downlink subbands, or a combination thereof

2105

Determine an active common frequency resource for a slot of the full duplex slot type based at least in part on the common frequency resource configuration, the uplink bandwidth part, and the downlink bandwidth part, the one or more uplink subbands, the one or more downlink subbands, or a combination thereof

2110

Output a multicast message to a group of user equipments (UE)s in the slot via the determined active common frequency resource

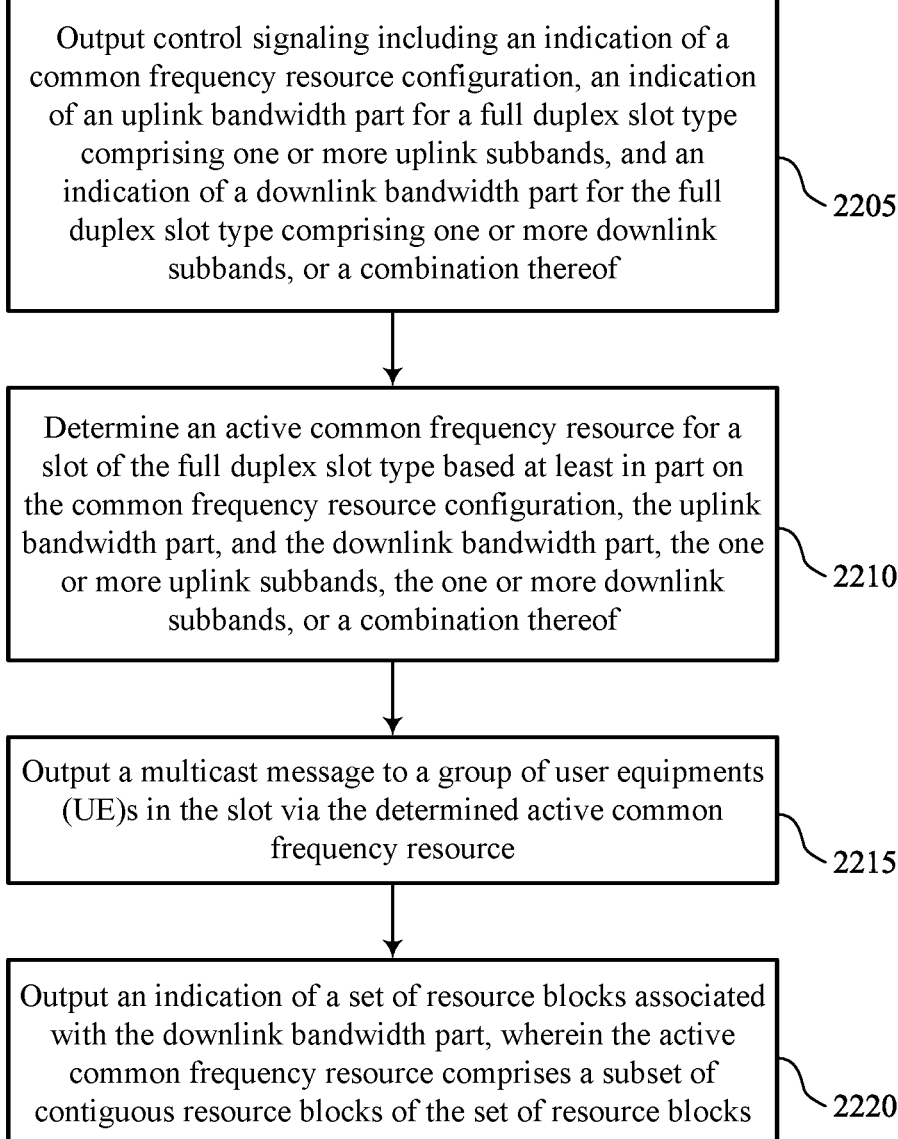

Output control signaling including an indication of a common frequency resource configuration, an indication of an uplink bandwidth part for a full duplex slot type comprising one or more uplink subbands, and an indication of a downlink bandwidth part for the full duplex slot type comprising one or more downlink subbands, or a combination thereof

2205

Determine an active common frequency resource for a slot of the full duplex slot type based at least in part on the common frequency resource configuration, the uplink bandwidth part, and the downlink bandwidth part, the one or more uplink subbands, the one or more downlink subbands, or a combination thereof

2210

Output a multicast message to a group of user equipments (UE)s in the slot via the determined active common frequency resource

2215

Output an indication of a set of resource blocks associated with the downlink bandwidth part, wherein the active common frequency resource comprises a subset of contiguous resource blocks of the set of resource blocks

MULTICAST SCHEDULING IN A FULL DUPLEX NETWORK

FIELD OF TECHNOLOGY

The following relates to wireless communications, including multicast scheduling in a full duplex network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multicast scheduling in a full duplex network. For example, the described techniques provide for transmission and reception of a multicast message via a common frequency resource (CFR) in a full duplex slot. For example, multicast messages may include group-common physical downlink control channel (PDCCH) messages or group-common physical downlink shared channel (PDSCH) messages. The CFR may be positioned within the downlink bandwidth parts (BWP)s configured for the group of user equipments (UE)s such that each UE in the group may monitor for and receive the multicast message. The network may indicate the frequency position of the CFR to the group of UEs, for example, via radio resource control (RRC) signaling. The frequency resources (e.g., the resource blocks (RB)s) configured for downlink for a UE may be different between half duplex slots and full duplex slots. Accordingly, the network and the UE may determine the active CFR for a full duplex slot based on the resources configured for the full duplex slot. The UE may monitor for and receive a multicast transmission in the active CFR in the full duplex slot.

A method for wireless communications at a UE is described. The method may include receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof, determining an active CFR for a slot of the full duplex slot type based on the CFR configuration, the uplink BWP, the downlink BWP, the one or more uplink subbands, the one or more downlink subbands, or a combination thereof, and receiving, from the network entity, a multicast transmission in the slot via the determined active CFR.

An apparatus for wireless communications at a UE is described. The apparatus may include a processor, memory coupled with the processor, and instructions stored in the memory. The instructions may be executable by the processor to cause the apparatus to receive, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof, determine an active CFR for a slot of the full duplex slot type based on the CFR configuration, the uplink BWP, the downlink BWP, the one or more uplink subbands, the one or more downlink subbands, or a combination thereof, and receive, from the network entity, a multicast transmission in the slot via the determined active CFR.

Another apparatus for wireless communications at a UE is described. The apparatus may include means for receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof, means for determining an active CFR for a slot of the full duplex slot type based on the CFR configuration, the uplink BWP, the downlink BWP, the one or more uplink subbands, the one or more downlink subbands, or a combination thereof, and means for receiving, from the network entity, a multicast transmission in the slot via the determined active CFR.

A non-transitory computer-readable medium storing code for wireless communications at a UE is described. The code may include instructions executable by a processor to receive, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof, determine an active CFR for a slot of the full duplex slot type based on the CFR configuration, the uplink BWP, the downlink BWP, the one or more uplink subbands, the one or more downlink subbands, or a combination thereof, and receive, from the network entity, a multicast transmission in the slot via the determined active CFR.

In some examples of the method, apparatuses, and non-transitory computer-readable medium described herein, receiving the control signaling may include operations, features, means, or instructions for receiving an indication of a first set of RBs associated with the CFR configuration and an indication of a second set of RBs associated with the downlink BWP, and where determining the active CFR includes determining an overlapping set of RBs between the first set of RBs and the second set of RBs.

Some examples of the method, apparatuses, and non-transitory computer-readable medium described herein may further include operations, features, means, or instructions for receiving second control signaling scheduling the slot with the full duplex slot type, where the CFR configuration indicates respective CFRs associated with a set of downlink BWPs, the set of downlink BWPs including the downlink BWP, and where determining the active CFR includes determining the respective CFR associated with the downlink BWP.

In some examples of the method, apparatuses, and non-transitory computer-readable medium described herein, at least one downlink BWP of the set of downlink BWPs includes two non-contiguous subbands and the CFR configuration further indicates respective CFRs associated with the two non-contiguous subbands.

In some examples of the method, apparatuses, and non-transitory computer-readable medium described herein, receiving the control signaling may include operations, features, means, or instructions for receiving an indication of a set of communication resources that may be unavailable for the active CFR.

In some examples of the method, apparatuses, and non-transitory computer-readable medium described herein, determining the active CFR may include operations, features, means, or instructions for determining, based on a subset of frequency resources of the downlink BWP overlapping with uplink resources, that the active CFR does not include the subset of frequency resources.

In some examples of the method, apparatuses, and non-transitory computer-readable medium described herein, receiving the control signaling may include operations, features, means, or instructions for receiving an indication of a second downlink BWP for a half duplex slot type, and where the CFR configuration includes an indication of a first CFR associated with the full duplex slot type and a second CFR associated with the half duplex slot type, where determining the active CFR for the slot includes determining the first CFR based on the slot being the full duplex slot type.

Some examples of the method, apparatuses, and non-transitory computer-readable medium described herein may further include operations, features, means, or instructions for receiving, from the network entity, a second multicast transmission in a second slot of the half duplex slot type via the second CFR.

In some examples of the method, apparatuses, and non-transitory computer-readable medium described herein, the multicast transmission includes one of a group-common downlink control channel message or a group-common downlink shared channel message.

In some examples of the method, apparatuses, and non-transitory computer-readable medium described herein, receiving the control signaling may include operations, features, means, or instructions for receiving an indication of a set of RBs associated with the downlink BWP, where the active CFR includes a subset of contiguous RBs of the set of RBs.

A method for wireless communications at a network entity is described. The method may include outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof, determining an active CFR for a slot of the full duplex slot type based on the CFR configuration, the uplink BWP, the downlink BWP, the one or more uplink subbands, the one or more downlink subbands, or a combination thereof, and outputting a multicast message to a group of UEs in the slot via the determined active CFR.

An apparatus for wireless communications at a network entity is described. The apparatus may include a processor, memory coupled with the processor, and instructions stored in the memory. The instructions may be executable by the processor to cause the apparatus to output control signaling including an indication of a CFR configuration, an indication of an uplink BWP for a full duplex slot type including one or more uplink subbands, and an indication of a downlink BWP for the full duplex slot type including one or more downlink subbands, or a combination thereof, determine an active CFR for a slot of the full duplex slot type based on the CFR configuration, the uplink BWP, the downlink BWP, the one or more uplink subbands, the one or more downlink subbands, or a combination thereof, and output a multicast message to a group of UEs in the slot via the determined active CFR.

Another apparatus for wireless communications at a network entity is described. The apparatus may include means for outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof, means for determining an active CFR for a slot of the full duplex slot type based on the CFR configuration, the uplink BWP, the downlink BWP, the one or more uplink subbands, the one or more downlink subbands, or a combination thereof, and means for outputting a multicast message to a group of UEs in the slot via the determined active CFR.

A non-transitory computer-readable medium storing code for wireless communications at a network entity is described. The code may include instructions executable by a processor to output control signaling including an indication of a CFR configuration, an indication of an uplink BWP for a full duplex slot type including one or more uplink subbands, and an indication of a downlink BWP for the full duplex slot type including one or more downlink subbands, or a combination thereof, determine an active CFR for a slot of the full duplex slot type based on the CFR configuration, the uplink BWP, the downlink BWP, the one or more uplink subbands, the one or more downlink subbands, or a combination thereof, and output a multicast message to a group of UEs in the slot via the determined active CFR.

In some examples of the method, apparatuses, and non-transitory computer-readable medium described herein, outputting the control signaling may include operations, features, means, or instructions for outputting an indication of a first set of RBs associated with the CFR configuration and an indication of a second set of RBs associated with the downlink BWP, and where determining the active CFR includes determining an overlapping set of RBs between the first set of RBs and the second set of RBs.

Some examples of the method, apparatuses, and non-transitory computer-readable medium described herein may further include operations, features, means, or instructions for outputting second control signaling scheduling the slot with the full duplex slot type, where the CFR configuration indicates respective CFRs associated with a set of downlink BWPs, the set of downlink BWPs including the downlink BWP, and where determining the active CFR includes determining the respective CFR associated with the downlink BWP.

In some examples of the method, apparatuses, and non-transitory computer-readable medium described herein, at least one downlink BWP of the set of downlink BWPs includes two non-contiguous subbands and the CFR configuration further indicates respective CFRs associated with the two non-contiguous subbands.

In some examples of the method, apparatuses, and non-transitory computer-readable medium described herein, outputting the control signaling may include operations, features, means, or instructions for outputting an indication of a set of communication resources that may be unavailable for the active CFR.

In some examples of the method, apparatuses, and non-transitory computer-readable medium described herein, determining the active CFR may include operations, features, means, or instructions for determining, based on a subset of frequency resources of the downlink BWP overlapping with uplink resources, that the active CFR does not include the subset of frequency resources.

In some examples of the method, apparatuses, and non-transitory computer-readable medium described herein, outputting the control signaling may include operations, features, means, or instructions for outputting an indication of a second downlink BWP for a half duplex slot type, and where the CFR configuration includes an indication of a first CFR associated with the full duplex slot type and a second CFR associated with the half duplex slot type, where determining the active CFR for the slot includes determining the first CFR based on the slot being the full duplex slot type.

Some examples of the method, apparatuses, and non-transitory computer-readable medium described herein may further include operations, features, means, or instructions for outputting a second multicast transmission to the group of UEs in a second slot of the half duplex slot type via the second CFR.

In some examples of the method, apparatuses, and non-transitory computer-readable medium described herein, the second multicast transmission includes one of a group-common downlink control channel message or a group-common downlink shared channel message.

In some examples of the method, apparatuses, and non-transitory computer-readable medium described herein, outputting the control signaling may include operations, features, means, or instructions for outputting an indication of a set of RBs associated with the downlink BWP, where the active CFR includes a subset of contiguous RBs of the set of RBs.

BRIEF DESCRIPTION OF THE DRAWINGS

FIGS. 18 through 22 show flowcharts illustrating methods that support multicast scheduling in a full duplex network in accordance with one or more aspects of the present disclosure.

DETAILED DESCRIPTION

Some wireless communications systems may implement subband full duplex (SBFD) communications, where a first bandwidth part (BWP) may be used for communications in one direction (one of uplink or downlink), and a second BWP may be used for communications in the other direction in a same time resource (e.g., the same slot or symbol). A network entity may transmit multicast messages to groups of user equipments (UE)s using a common frequency resource (CFR). For example, multicast messages may include group-common physical downlink control channel (PDCCH) messages or group-common physical downlink shared channel (PDSCH) messages. The CFR may be positioned within the downlink BWPs configured for the group of UEs such that each UE in the group may monitor for and receive the multicast message. The network may indicate the frequency position of the CFR to the group of UEs, for example, via radio resource control (RRC) signaling. The frequency resources (e.g., the resource blocks (RB)s) configured for downlink for a UE may be different between half duplex slots and full duplex slots. Accordingly, in some cases, the CFR indicated by the network may be inaccurate for a full duplex slot if configured for a half duplex slot, as the CFR may include uplink resources in a full duplex slot.

The network and the UE may determine the active CFR for a full duplex slot based on the resources configured for the full duplex slot. The UE may monitor for and receive a multicast transmission in the active CFR in the full duplex slot. For example, a UE may identify the RBs of a downlink BWP (e.g., or the downlink subbands) in a full duplex slot that overlap with the configured CFR in order to determine the active CFR. As another example, the network may indicate (e.g., via RRC signaling) a first CFR for half duplex communications and a second CFR for full duplex communications. The UE may then determine whether to apply the first CFR or the second CFR to a given slot based on whether the slot is a half duplex slot or a full duplex slot. As another example, the network may indicate a CFR for each downlink BWP of a set of candidate downlink BWPs, and the UE may determine which CFR to apply to a given slot based on the downlink BWP configured for that slot.

Aspects of the disclosure are initially described in the context of wireless communications systems. Aspects of the disclosure are further illustrated by and described with reference to resource diagrams, slot formats, CFR formats, sub-BWP formats, and process flows. Aspects of the disclosure are further illustrated by and described with reference to apparatus diagrams, system diagrams, and flowcharts that relate to multicast scheduling in a full duplex network.

Figure 1:
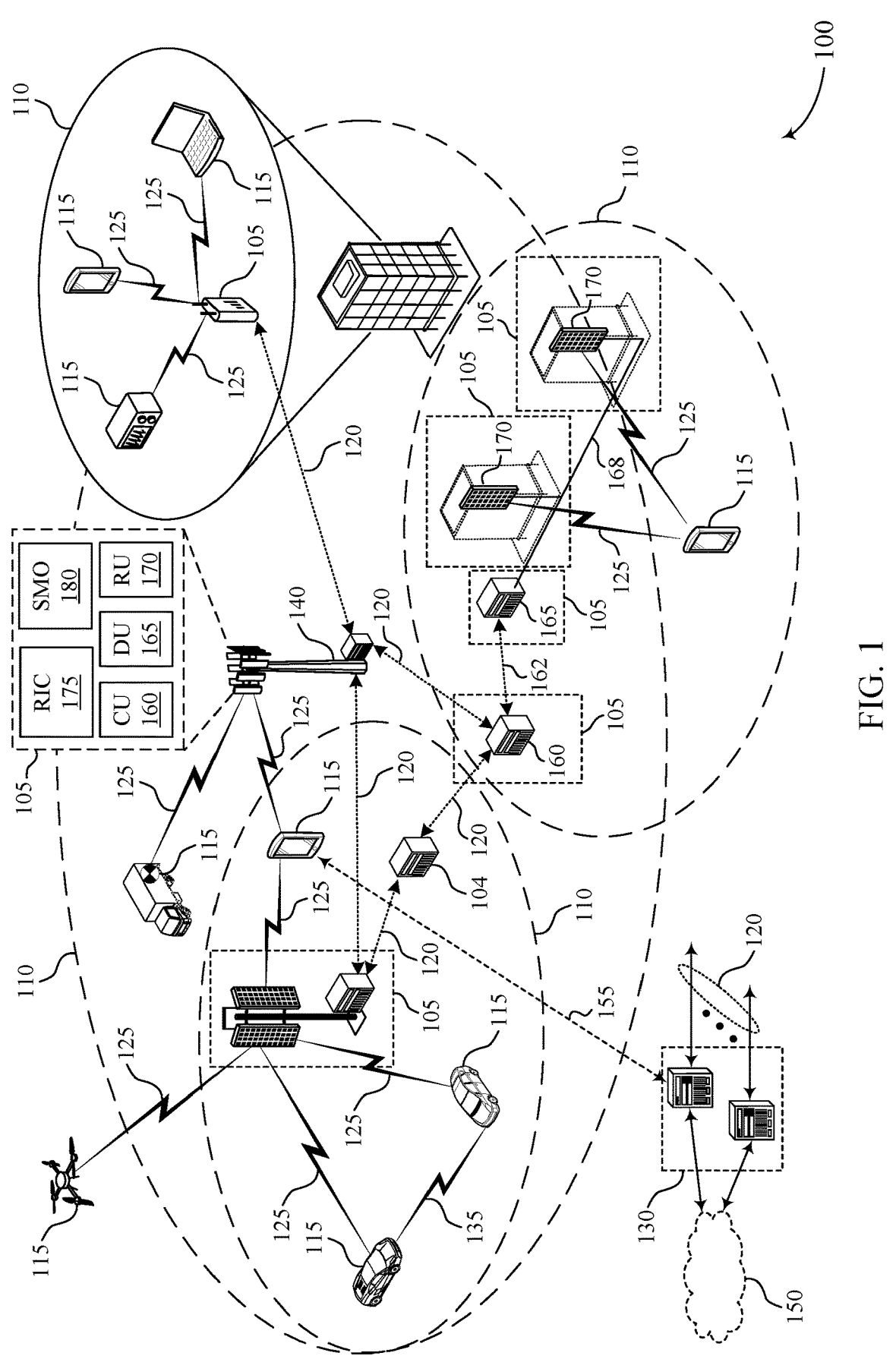
FIG. 1 illustrates an example of a wireless communications system that supports multicast scheduling in a full duplex network in accordance with one or more aspects of the present disclosure.

FIG. 1 illustrates an example of a wireless communications system 100 that supports multicast scheduling in a full duplex network in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multicast scheduling in a full duplex network as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carrier (CC)s and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity

105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may implement SBFD communications. In some examples, A network entity 105 may transmit multicast messages to a group of UEs 115 using a CFR. For example, multicast messages may include group-common PDCCH messages or group-common PDSCH messages. The CFR may be positioned within the downlink BWPs configured for the group of UEs 115 such that each UE 115 in the group may monitor for and receive the multicast message. The network entity 105 may indicate the frequency position of the CFR to the group of UEs 115, for example, via RRC signaling. The frequency resources (e.g., the RBs) configured for downlink for a UE 115 may be different between half duplex slots and full duplex (e.g., SBFD) slots. Accordingly, in some cases, the CFR indicated by the network entity 105 may be inaccurate for a full duplex slot if the CFR is indicated in association with a half duplex configuration, as the CFR may include uplink resources in a full duplex slot.

The network entity 105 and the UE 115 may determine the actual CFR for a full duplex slot based on the resources configured for the full duplex slot. The UE 115 may monitor for and receive a multicast transmission in the actual CFR in the full duplex slot. For example, a UE 115 may identify the RBs of a downlink BWP (e.g., or the downlink subbands) in a full duplex slot that overlap with the configured CFR in order to determine the actual CFR. As another example, the network entity 105 may indicate (e.g., via RRC signaling) a first CFR for half duplex communications and a second CFR for full duplex communications. The UE 115 may then determine whether to apply the first CFR or the second CFR to a given slot based on whether the slot is a half duplex slot or a full duplex slot. As another example, the network entity 105 may indicate a CFR for each downlink BWP of a set of candidate downlink BWPs, and the UE 115 may determine which CFR to apply to a given slot based on the downlink BWP configured for that slot.

Figure 2:
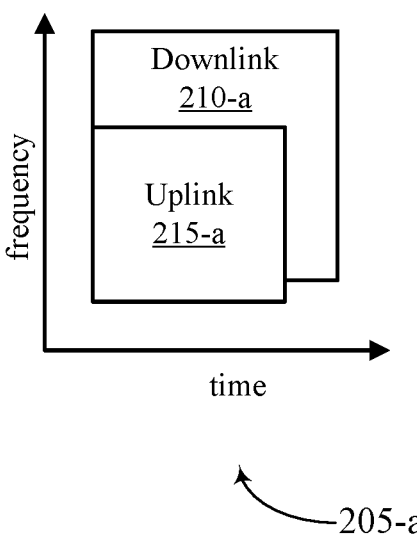
FIG. 2 illustrates an example of a resource diagram that supports multicast scheduling in a full duplex network in accordance with one or more aspects of the present disclosure.
Figure 2:
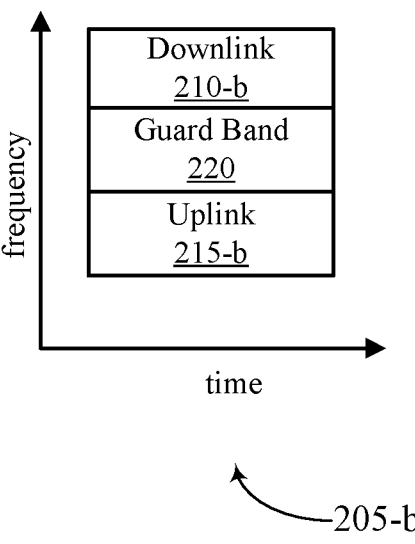

FIG. 2 illustrates an example of a resource diagram 200 that supports multicast scheduling in a full duplex network in accordance with one or more aspects of the present disclosure. The resource diagram 200 may implement aspects of the wireless communications system 100.

As described herein, some wireless communications systems may implement full duplex communications. Full duplex communications may be in-band full duplex (IBFD) communications or subband FDD communications (e.g., flexible duplex).

A first example 205-a illustrates an IBFD example. In IBFD, a wireless device (e.g., a network entity 105 or a UE 115) may transmit and receive at the same time on the same frequency resource. For example, a downlink resources 210-a and uplink resources 215-a may fully or partially overlap (e.g., the downlink resources 210-a and the uplink resources 215-a may share same IBFD time and/or frequency resources).

A second example 205-b illustrates a subband FDD example. In subband FDD a wireless device (e.g., a network entity 105 or a UE 115) may transmit and receive at the same time but on different frequency resources. For example, the downlink resources 210-b may be separated from the uplink resources 215-b in the frequency domain (e.g., via a guard band 220).

Figure 3:
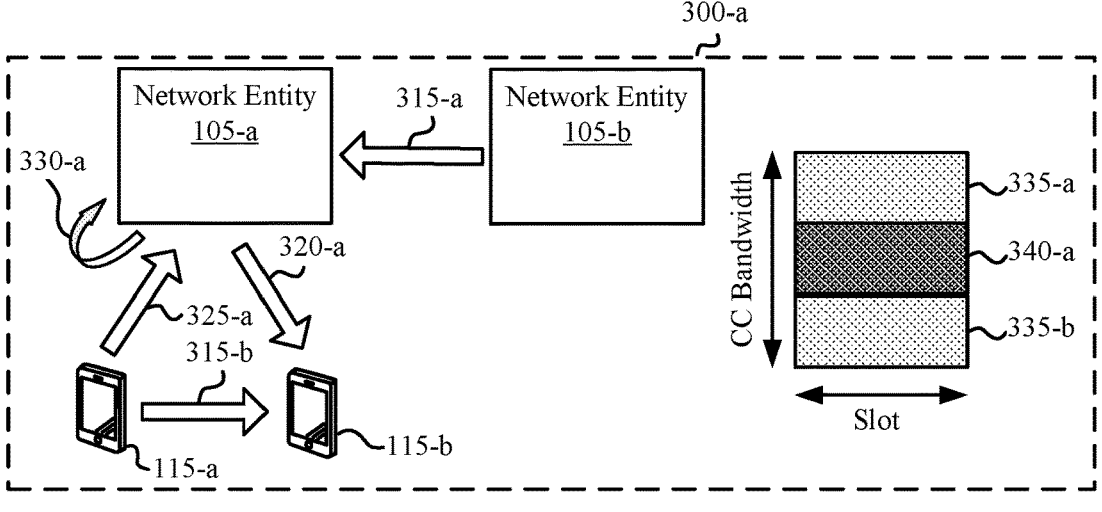
FIG. 3 illustrates examples of wireless communications systems that supports multicast scheduling in a full duplex network in accordance with one or more aspects of the present disclosure.
Figure 3:
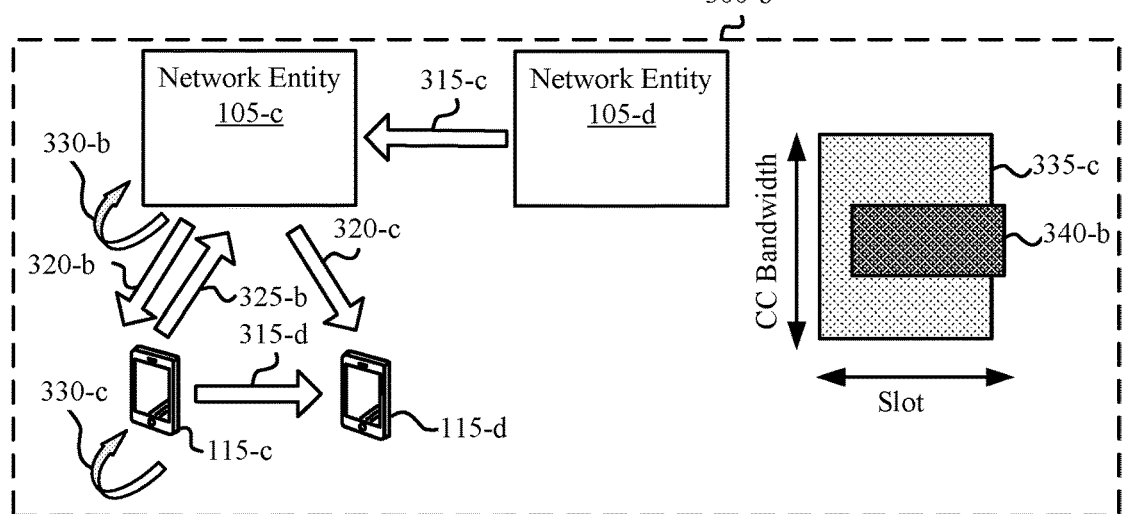
Figure 3:
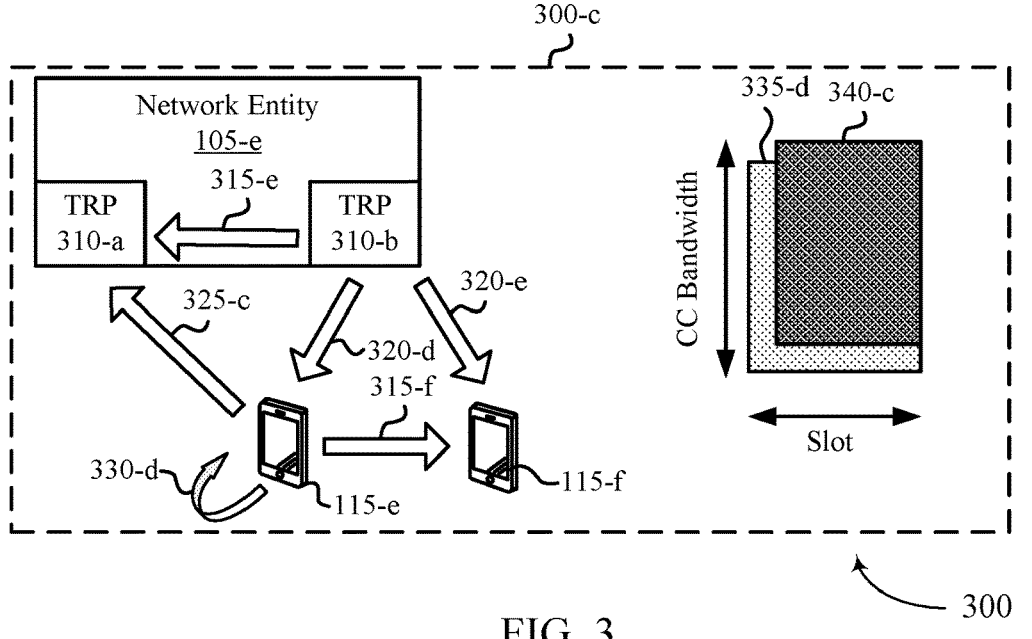

FIG. 3 illustrates an example of a wireless communications system 300-a, a wireless communications system 300-b, and a wireless communications system 300-c that support multicast scheduling in a full duplex network in accordance with one or more aspects of the present disclosure. The wireless communications system 300-*a*, the wireless communications system 300-*b*, and the wireless communications system 300-*c* may implement aspects of the wireless communications system 100. For example, the wireless communications system 300-*a* may include a first UE 115-*a* and a second UE 115-*b*, the wireless communications system 300-*b* may include a first UE 115-*c* and a second UE 115-*d*, and the wireless communications system 300-*c* may include a first UE 115-*e* and a second UE 115-*f*, which may be examples of a UE 115 as described herein. The wireless communications system 300-*a* may include a network entity 105-*a* and a network entity 105-*b*, the wireless communications system 300-*b* may include a network entity 105-*c* and a network entity 105-*d*, and the wireless communications system 300-*c* may include a network entity 105-*e* which may be examples of a network entity 105 as described herein.

The wireless communications system 300-*a* illustrates an example where the network entity 105-*a* operates in full duplex and each of the first UE 115-*a* and the second UE 115-*b* operates in half duplex. For example, the network entity 105-*a* may transmit downlink signals 320-*a* to the second UE 115-*b* using downlink resources (e.g., downlink resources 335-*a* or downlink resources 335-*b*), and the first UE 115-*a* may transmit uplink signals 325-*a* to the network entity 105-*a* using uplink resources 340-*a*. The uplink resources 340-*a* may be non-overlapping with the downlink resources 335-*a* and the downlink resources 335-*b*. The uplink signals 325-*a* transmitted by the first UE 115-*a* may cause cross-link interference 315-*b* at the second UE 115-*b*. Transmissions by the network entity 105-*b* may cause cross-link interference 315-*a* at the network entity 105-*a*. Transmissions of the downlink signals 320-*a* by the network entity 105-*a* may cause self-interference 330-*a* at the network entity 105-*a* with respect to reception of the uplink signals 325-*a*.

The wireless communications system 300-*b* illustrates an example where the network entity 105-*c* operates in full duplex and the first UE 115-*c* operates in full duplex. For example, the network entity 105-*c* may transmit downlink signals 320-*b* to the first UE 115-*c* using downlink resources 335-*c*, and the first UE 115-*c* may transmit uplink signals 325-*b* to the network entity 105-*c* using uplink resources 340-*b*. The network entity 105-*c* may also transmit downlink signals 320-*c* to the second UE 115-*d*. The uplink resources 340-*b* may be overlapping with (e.g., partially or fully overlapping with) the downlink resources 335-*c*. The uplink signals 325-*b* transmitted by the first UE 115-*c* may cause cross-link interference 315-*d* at the second UE 115-*d*. Transmissions by the network entity 105-*d* may cause cross-link interference 315-*c* at the network entity 105-*c*. Transmissions of the downlink signals 320-*b* or the downlink signals 320-*c* by the network entity 105-*c* may cause self-interference 330-*b* at the network entity 105-*a* with respect to reception of the uplink signals 325-*b*. Transmissions of the uplink signals 325-*b* by the first UE 115-*c* may cause self-interference 330-*c* at the first UE 115-*c* with respect to reception of the downlink signals 320-*b*.

The wireless communications system 300-*c* illustrates an example where the network entity includes multiple TRPs (e.g., a first TRP 310-*a* and a second TRP 310-*b*) and operates in full duplex, and the first UE 115-*e* operates in full duplex. For example, the first UE 115-*e* may support SBFD operation. For example, the second TRP 310-*b* may transmit downlink signals 320-*d* to the first UE 115-*e* using downlink resources 335-*d* and the second TRP 310-*b* may transmit downlink signals 320-*e* to the second UE 115-*f* using the downlink resources 335-*d*. The first UE 115-*e* may transmit uplink signals 325-*c* to the first TRP 310-*a* using uplink resources 340-*c*. The uplink resources 340-*c* may be overlapping with (e.g., partially or fully overlapping with) the downlink resources 335-*d*. Transmissions by the second TRP 310-*b* of the downlink signals 320-*d* and the downlink signals 320-*e* may cause cross-link interference 315-*e* at the first TRP 310-*a*. The uplink signals 325-*c* transmitted by the first UE 115-*e* may cause cross-link interference 315-*f* at the second UE 115-*f* Transmissions of the uplink signals 325-*c* by the first UE 115-*e* may cause self-interference 330-*d* at the first UE 115-*e* with respect to reception of the downlink signals 320-*d*.

Some wireless communications systems may include TDD bands only. Some wireless communications systems (e.g., the wireless communications system 300-*a*), may include full duplex operation at the network and half duplex operation at the UE. Some wireless communications systems may support SBFD full duplex (e.g., no overlapping between downlink and uplink frequency resources).

Figure 4:
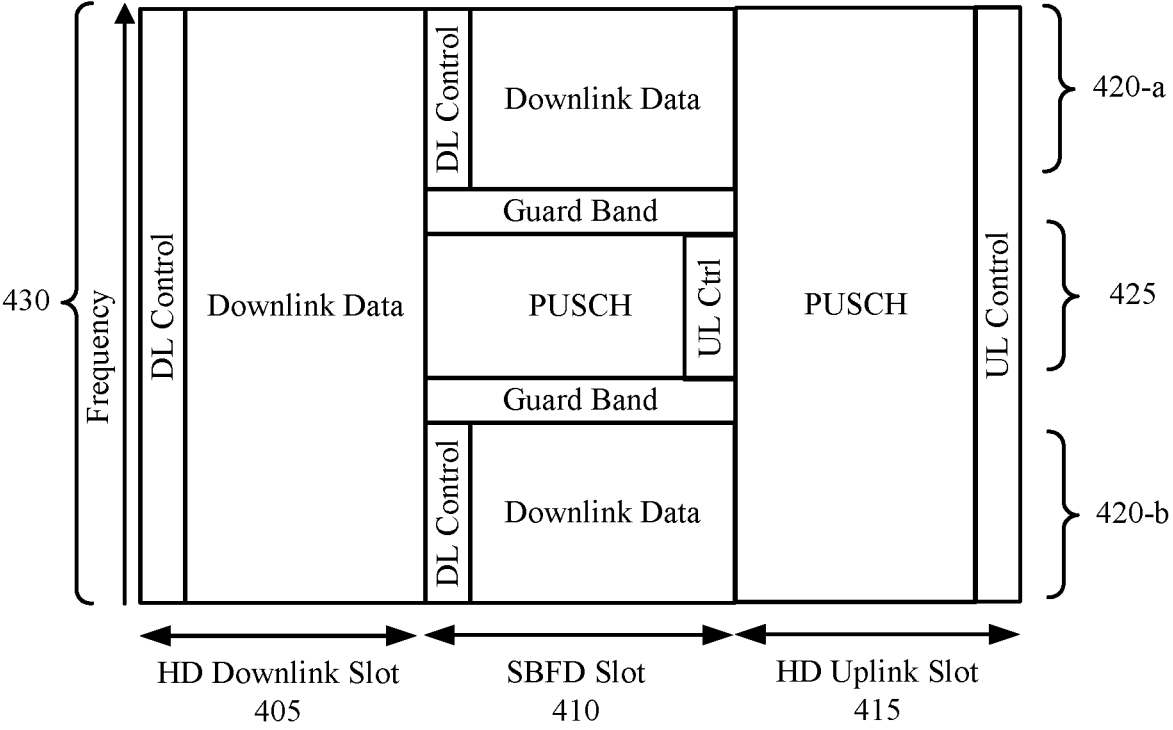
FIG. 4 illustrates an example of a slot format that supports multicast scheduling in a full duplex network in accordance with one or more aspects of the present disclosure.

FIG. 4 illustrates an example of a slot format 400 that supports multicast scheduling in a full duplex network in accordance with one or more aspects of the present disclosure. The slot format 400 may implement aspects of the wireless communications system 100, the wireless communications system 300-*a*, the wireless communications system 300-*b*, or the wireless communications system 300-*c*.

The slot format 400 illustrates an example half duplex downlink slot 405, an SBFD slot 410, and a half duplex uplink slot 415 for an carrier bandwidth 430. The half duplex downlink slot 405 includes a downlink control region (e.g., resources for downlink control) and a downlink data region (e.g., resources for downlink data). The half duplex uplink slot 415 includes an uplink data region (e.g., resources for physical uplink shared channel (PUSCH)) and an uplink control region (e.g., resources for uplink control).

The SBFD slot 410 includes a downlink BWP including a first downlink subband 420-*a* and a second downlink subband 420-*b*. In a 'D+U' slot, as in SBFD slot 410, the carrier bandwidth 430 may be used for both uplink and downlink transmissions. As illustrated in FIG. 4, the SBFD slot 410 includes an uplink BWP including an uplink subband 425. Guard bands may separate the first downlink subband 420-*a* and the second downlink subband 420-*b* from the uplink subband 425. The first downlink subband 420-*a* includes a downlink control region and a downlink data region. The second downlink subband 420-*b* includes a downlink control region and a downlink data region. The uplink subband 425 includes a PUSCH region and an uplink control region. In some examples, in a 'D+U' slot, downlink and uplink transmissions may occur in overlapping frequency bands (e.g., IBFD operation). In some examples, in a 'D+U' slot, as shown in SBFD slot 410, downlink and uplink transmissions may occur in adjacent, non-overlapping bands. If scheduled with a 'D+U' slot, a half duplex UE 115 may either transmit in the uplink band (e.g., the uplink subband 425) or receive in the downlink band (e.g., the first downlink subband 420-*a* and the second downlink subband 420-*b*). If scheduled with a 'D+U' slot, a full duplex UE 115 (e.g., a UE 115 that supports simultaneous transmission and reception) may transmit in the uplink band (e.g., the uplink subband 425) and/or receive in the downlink band (e.g., the first downlink subband 420-*a* and the second downlink subband 420-*b*). A 'D+U' slot may include downlink only symbols, uplink only symbols, or full duplex symbols.

Figure 5:
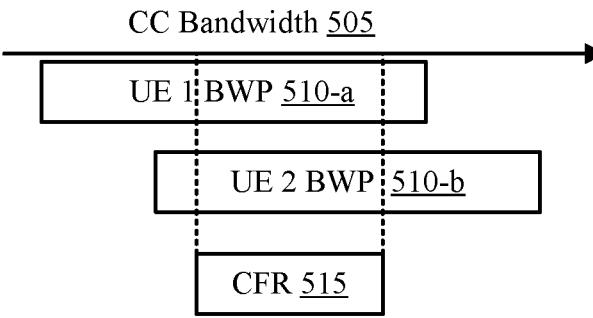
FIG. 5 illustrates an example of a common frequency resource format that supports multicast scheduling in a full duplex network in accordance with one or more aspects of the present disclosure.

FIG. 5 illustrates an example of a CFR format 500 that supports multicast scheduling in a full duplex network in accordance with one or more aspects of the present disclosure. The CFR format 500 may implement aspects of the wireless communications system 100, the wireless communications system 300-*a*, the wireless communications system 300-*b*, or the wireless communications system 300-*c*.

In some examples, a network entity 105 may broadcast or multicast messages (e.g., group-common PDCCH messages or group-common PDSCH messages), for examples for UEs 115 in an RRC connected mode. For example, for a CC bandwidth 505, a CFR 515 for group-common PDCCH or PDSCH may be configured within the frequency resource of a dedicated unicast BWP using the same numerology (e.g., the same subcarrier spacing (SCS) and cyclic prefix). For example, a first unicast BWP 510-*a* may be configured for a first UE for the CC bandwidth 505, and a second unicast BWP 510-*b* may be configured for a second UE for the CC bandwidth 505. The different unicast BWPs for the different UEs (e.g., the first unicast BWP 510-*a* and the second unicast BWP 510-*b*) may not be aligned in the frequency domain. One CFR 515 may be supported for multicasting to the multiple RRC connected UEs for the CC bandwidth 505. The one CFR 515 may be positioned within the unicast BWPs for the multiple RRC connected UEs 115.

A CFR 515 may be defined as a multicast and broadcast services (MBS) frequency region. The CFR 515 may be associated with a UE dedicated BWP (e.g., the first unicast BWP 510-*a*) other than an initial BWP, at least for RRC connected UEs. A configuration of a CFR 515 indicated in RRC signaling may include a starting physical RB (PRB) and the number of PRBs included in the CFR. In other words, the CFR 515 may be a contiguous set of PRBs. In some examples, RRC signaling may include an information element PDSCH-config for MBS (separate from that of the dedicated unicast BWP) that indicates the CFR 515. In some examples, RRC signaling may include an information element PDCCH-config for MBS (separate from that of the dedicated unicast BWP) that indicates the CFR 515. In some examples, RRC signaling may include one or more information elements for semi-persistent scheduling (SPS), SP S-config for MBS (separate from that of the dedicated unicast BWP) that indicates the CFR 515.

In a full duplex network, some slots may be SBFD slots, meaning that even for a half duplex UE 115 operating in a downlink mode, part of the BWP for the UE 115 may be dedicated for uplink transmission. The UE 115 may not expect reception of signals (e.g., group-common messages) in a band dedicated for uplink transmission. In some cases, RRC signaling may indicate the CFR configuration (e.g., in the information elements PDSCH-config, PDCCH-config, or SP S-Config) in accordance with the downlink BWPs configured for half duplex slots. For example, in half duplex slots, all of the first unicast BWP 510-*a* may be dedicated for downlink. In an SBFD slot, however, one or more subbands of the first unicast BWP 510-*a* may be dedicated for uplink. Accordingly, in some examples, parts of a configured CFR may be dedicated for uplink in an SBFD slot. Further, in some examples, slot formats may switch between half duplex and SBFD, and group-common messages should be transmitted in a CFR that accounts for changes in available downlink resources in an SBFD slot.

Figure 6:
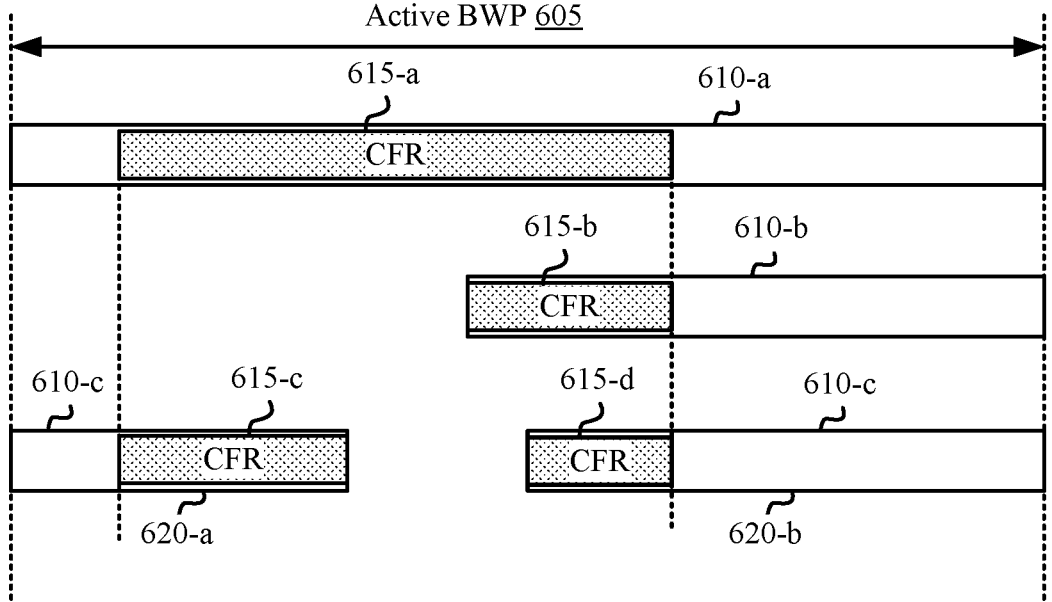
FIG. 6 illustrates an example of a sub-bandwidth part format that supports multicast scheduling in a full duplex network in accordance with one or more aspects of the present disclosure.

FIG. 6 illustrates an example of a sub-BWP format 600 that supports multicast scheduling in a full duplex network in accordance with one or more aspects of the present disclosure. The sub-BWP format 600 may implement aspects of the wireless communications system 100, the wireless communications system 300-*a*, the wireless communications system 300-*b*, or the wireless communications system 300-*c*.

Sub-BWP framework may facilitate operation over multiple disjoint downlink subbands within an active BWP 605 for a UE 115. In some examples, as described herein, RRC signaling may indicate a CFR 615-*a* for a downlink resource bandwidth 610-*a* that spans the active BWP 605 for a UE 115.

In some examples, the indicated CFR 615-*a* may be used to derive an active CFR for a downlink resource bandwidth (e.g., for an SBFD slot) by finding the overlap between the downlink resource bandwidth and the indicated CFR 615-*a*. For example, for an SBFD slot, a UE 115 may be configured with a downlink resource bandwidth 610-*b*. The UE 115 may determine the active CFR 615-*b* for the downlink resource bandwidth 610-*b* by finding the overlap between the indicated CFR 615-*a* and the downlink resource bandwidth 610-*b*.

In some examples, each sub-BWP may be indicated with a CFR (e.g., in RRC). For example, RRC signaling may indicate the CFR 615-*a* for the downlink resource bandwidth 610-*a*, the CFR 615-*b* for the downlink resource bandwidth 610-*b*, and the CFR 615-*c* for the downlink resource bandwidth 610-*c*. The UE 115 may determine which CFR is the active CFR for a given slot based on the active downlink resource bandwidth for the slot.

In some examples, a CFR may be defined per sub-band per sub-BWP. For example, the RRC signaling may indicate a CFR 615-*c* for the subband 620-*a* and a CFR 615-*d* for the subband 620-*b* of the downlink resource bandwidth 610-*c*.

Figure 7:
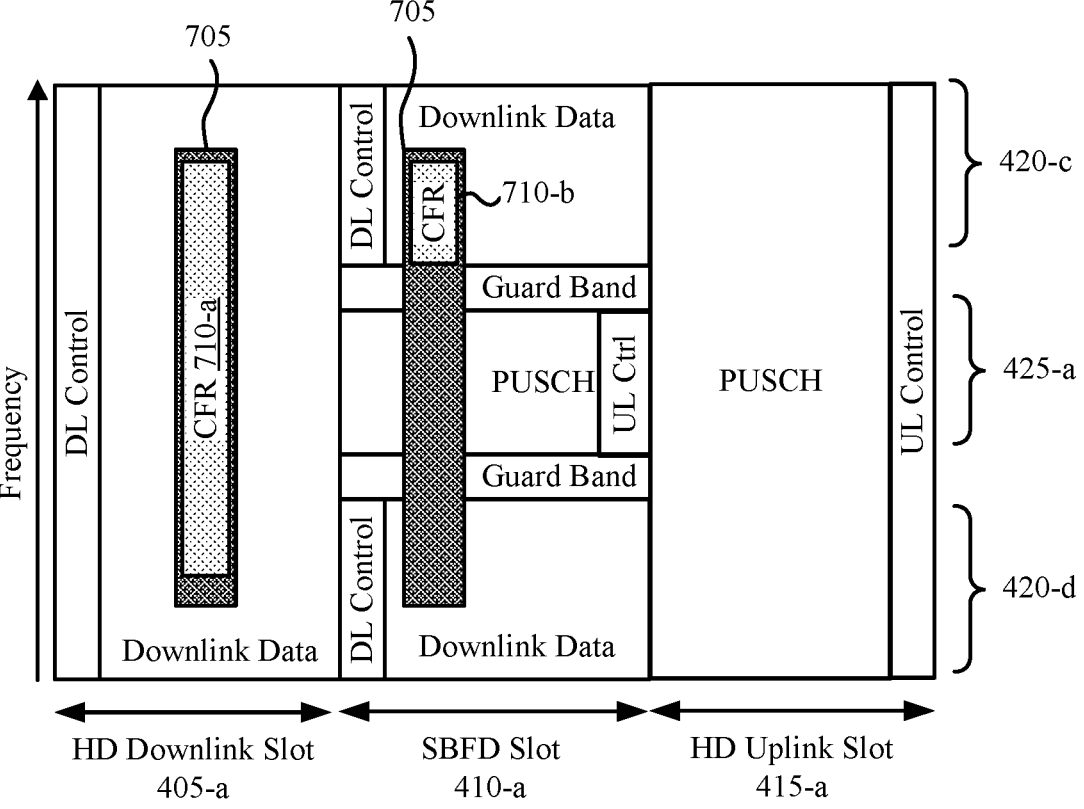
FIG. 7 illustrates an example of a slot format that supports multicast scheduling in a full duplex network in accordance with one or more aspects of the present disclosure.

FIG. 7 illustrates an example of a slot format 700 that supports multicast scheduling in a full duplex network in accordance with one or more aspects of the present disclosure. The slot format 700 may implement aspects of the wireless communications system 100, the wireless communications system 300-*a*, the wireless communications system 300-*b*, or the wireless communications system 300-*c*.

The slot format 700 illustrates an example half duplex downlink slot 405-*a*, an SBFD slot 410-*a*, and a half duplex uplink slot 415-*a*, which may be examples of a half duplex downlink slot 405, an SBFD slot 410, and a half duplex uplink slot 415 as described with reference to FIG. 4.

The SBFD slot 410-*a* includes a downlink BWP including a first downlink subband 420-*c* and a second downlink subband 420-*d*. Guard bands may separate the first downlink subband 420-*c* and the second downlink subband 420-*d* from the uplink subband 425-*a*.

In some examples, a full duplex UE 115 may be configured with a downlink BWP 705 that overlaps with the uplink subband 425-*a* in the SBFD slot 410-*a*. A CFR 710-*a* may be configured within the downlink BWP 705. In some examples, the CFR 710-*b* within the SBFD slot 410-*a* may be configured with certain resources to be unavailable for multi-cast. The configuration may be implicit or explicit. For example, if the configuration is implicit, the UE 115 may determine that resources that overlap with the uplink subband 425-*a* are unavailable for a CFR 710-*b* in the SBFD slot 410-*a*. In some examples, the network may explicitly indicate (e.g., via RRC signaling) an explicit configuration indicating resources that are unavailable for the CFR 710-*b* in the SBFD slot 410-*a*.

In some examples, the UE 115 may be configured with two CFR configurations (e.g., CFR 710-*a* for a half duplex slot and CFR 710-*b* for an SBFD slot). If the UE 115 switches the active downlink BWP by switching between different slot types (e.g., from half duplex to SBFD), the UE 115 may follow the CFR configured for the active BWP (e.g., based on the slot type). In some cases, if the BWP does not change from a half duplex slot to a full duplex slot, the CFR configuration may change to include resources that are not available for transmission.

Figure 8:
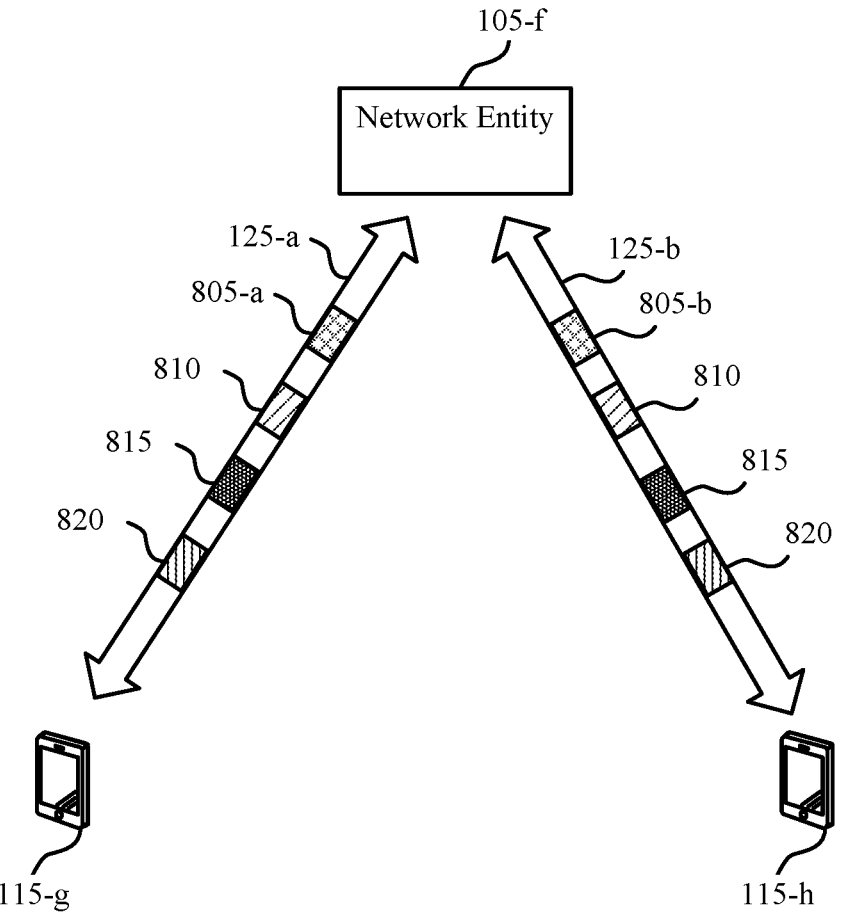
FIG. 8 illustrates an example of a wireless communications system that supports multicast scheduling in a full duplex network in accordance with one or more aspects of the present disclosure.

FIG. 8 illustrates an example of a wireless communications system 800 that supports multicast scheduling in a full duplex network in accordance with one or more aspects of the present disclosure. The wireless communications system 800 may include a UE 115-g and a UE 115-h, which may be examples of a UE 115 as described herein. The wireless communications system 800 may include a network entity 105-f, which may be an example of a network entity 105 as described herein.

The UE 115-g may communicate with the network entity 105-f using a communication link 125-a, which may be an example of an NR or LTE link between the UE 115-g and the network entity 105-f. The communication link 125-a may include a bi-directional link that enables both uplink and downlink communication. For example, the UE 115-g may transmit uplink transmissions, such as uplink control signals or uplink data signals, to the network entity 105-f using the communication link 125-a and the network entity 105-f may transmit downlink transmissions, such as downlink control signals or downlink data signals, to the UE 115-g using the communication link 125-a. The UE 115-h may communicate with the network entity 105-f using a communication link 125-b, which may be an example of an NR or LTE link between the UE 115-h and the network entity 105-f. The communication link 125-b may include a bi-directional link that enables both uplink and downlink communication. For example, the UE 115-h may transmit uplink transmissions, such as uplink control signals or uplink data signals, to the network entity 105-f using the communication link 125-b and the network entity 105-f may transmit downlink transmissions, such as downlink control signals or downlink data signals, to the UE 115-h using the communication link 125-b.

The network entity 105-f, the UE 115-g, and the UE 115-h may implement half duplex communications and full duplex communications (e.g., SBFD communications). The network entity 105-f may transmit multicast messages, for example, a multicast message 815, via a CFR. The network entity 105-f may transmit, to the UE 115-g, control signaling 805-a (e.g., RRC signaling) including an indication of a CFR configuration, an indication of an uplink BWP for a full duplex slot type including one or more uplink subbands for the UE 115-g, and an indication of a downlink BWP for the full duplex slot type including one or more downlink subbands for the UE 115-g. The network entity 105-f may transmit, to the UE 115-h, control signaling 805-b (e.g., RRC signaling) including an indication of the CFR configuration, an indication of an uplink BWP for a full duplex slot type including one or more uplink subbands for the UE 115-h, and an indication of a downlink BWP for the full duplex slot type including one or more downlink subbands for the UE 115-h.

Based on the indicated CFR configurations, and the respective uplink BWPs, the respective one or more uplink subbands, the respective downlink BWPs, and the respective one or more downlink subbands, the UE 115-g and the UE 115-h may determine a CFR for a full duplex slot (e.g., an SBFD slot). The UE 115-g and the UE 115-h may receive the multicast message 815 in a full duplex slot via the determined CFR. In some examples, the network entity 105-f may transmit second control signaling 810 scheduling a full duplex slot, and the UE 115-g and the UE 115-h may determine the CFR for the full duplex slot based on the second control signaling 810 scheduling the full duplex slot.

In some examples, the network entity 105-f may transmit a second multicast message 820 in a half duplex slot. For example, the CFR for the half duplex slot may be different than the CFR for a full duplex slot.

Figure 9:
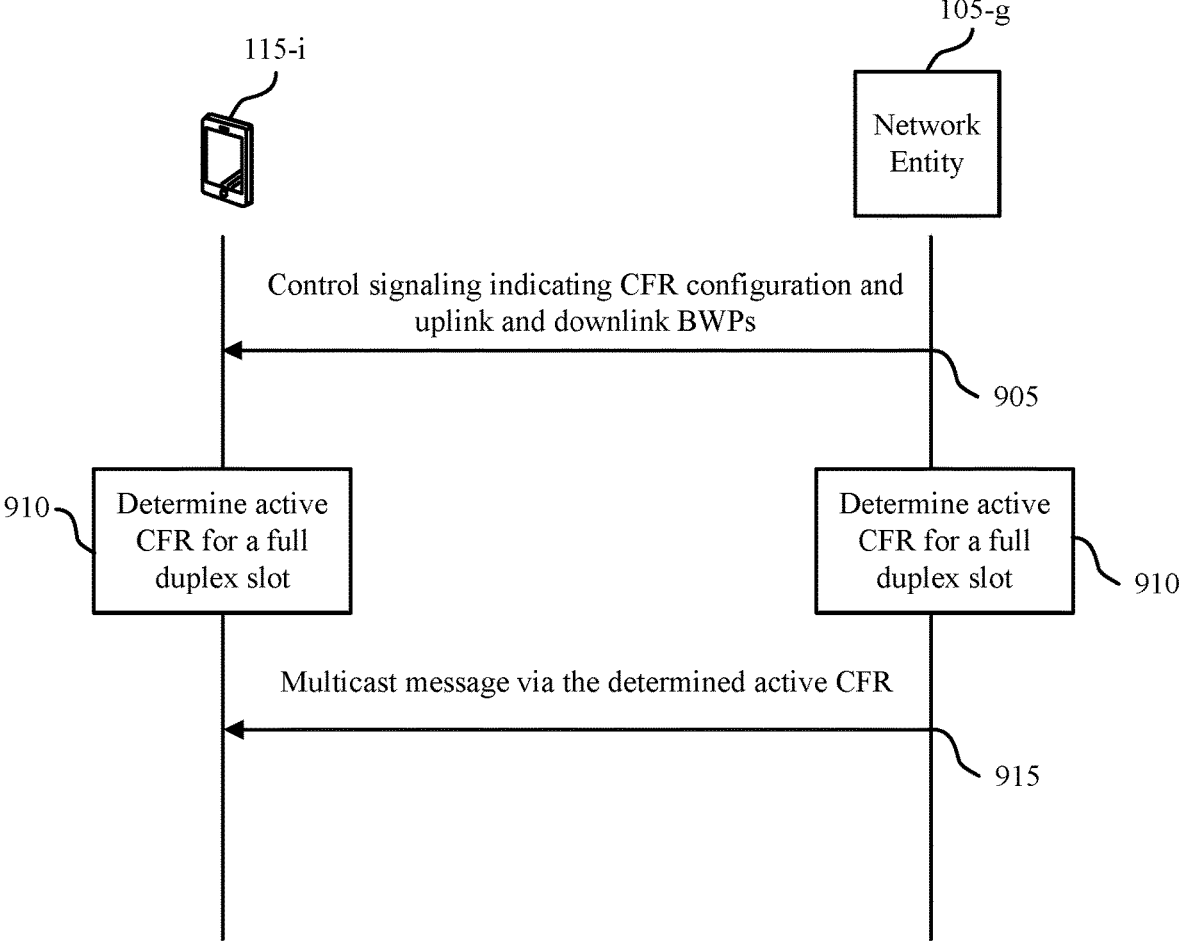
FIG. 9 illustrates an example of a process flow that supports multicast scheduling in a full duplex network in accordance with one or more aspects of the present disclosure.

FIG. 9 illustrates an example of a process flow 900 that supports multicast scheduling in a full duplex network in accordance with one or more aspects of the present disclosure. The process flow 900 may include a UE 115-i, which may be an example of a UE 115 as described herein. The process flow 900 may include a network entity 105-g, which may be an example of a network entity 105 as described herein. In the following description of the process flow 900, the operations between the network entity 105-g and the UE 115-i may be transmitted in a different order than the example order shown, or the operations performed by the network entity 105-g and the UE 115-i may be performed in different orders or at different times. Some operations may also be omitted from the process flow 900, and other operations may be added to the process flow 900.

At 905, the UE 115-i may receive, from the network entity 105-g, control signaling including an indication of a CFR configuration, an indication of an uplink BWP for a full duplex slot type including one or more uplink subbands, an indication of a downlink BWP for the full duplex slot type including one or more downlink subbands, or a combination thereof.

At 910, the UE 115-i and the network entity 105-g may determine an active CFR for a slot of the full duplex slot type based on the CFR configuration, the uplink BWP, the downlink BWP, the one or more uplink subbands, the one or more downlink subbands, or a combination thereof.

At 915, the UE 115-i may receive, from the network entity 105-g, a multicast transmission in the slot via the determined active CFR. In some examples, the network entity 105-g may output the multicast transmission in the slot via the determined active CFR to a groups of UEs including the UE 115-i.

In some examples, receiving the control signaling at 905 includes receiving an indication of a first set of RBs associated with the CFR configuration and an indication of a second set of RBs associated with the downlink BWP, and determining the active CFR includes determining an overlapping set of RBs between the first set of RBs and the second set of RBs.

In some examples, the UE 115-i may receive, from the network entity 105-g, second control signaling scheduling the slot with the full duplex slot type, where the CFR configuration indicates respective CFRs associated with a set of downlink BWPs, the set of downlink BWPs including the downlink BWP, and determining the active CFR includes determining the respective CFR associated with the downlink BWP. In some examples, at least one downlink BWP of the set of downlink BWPs includes two non-contiguous subbands, and the CFR configuration further indicates respective CFRs associated with the two non-contiguous subbands.

In some examples, receiving the control signaling at 905 includes receiving an indication of a set of communication resources that are unavailable for the active CFR.

In some examples, determining the active CFR at 910 includes determining, based on a subset of frequency resources of the downlink BWP overlapping with uplink resources, that the active CFR does not include the subset of frequency resources.

In some examples, receiving the control signaling at 905 includes receiving an indication of a second downlink BWP for a half duplex slot type, the CFR configuration includes an indication of a first CFR associated with the full duplex slot type and a second CFR associated with the half duplex slot type, and determining the active CFR for the slot includes determining the first CFR based on the slot being the full duplex slot type. In some examples, the UE 115-*i* may receive, from the network entity 105-*g*, a second multicast transmission in a second slot of the half duplex slot type via the second CFR.

In some examples, the multicast transmission may be one of a group-common downlink control channel message or a group-common downlink shared channel message.

In some examples, receiving the control signaling at 905 includes receiving an indication of a set of RBs associated with the downlink BWP, where the active CFR includes a subset of contiguous RBs of the set of RBs.

Figure 10:
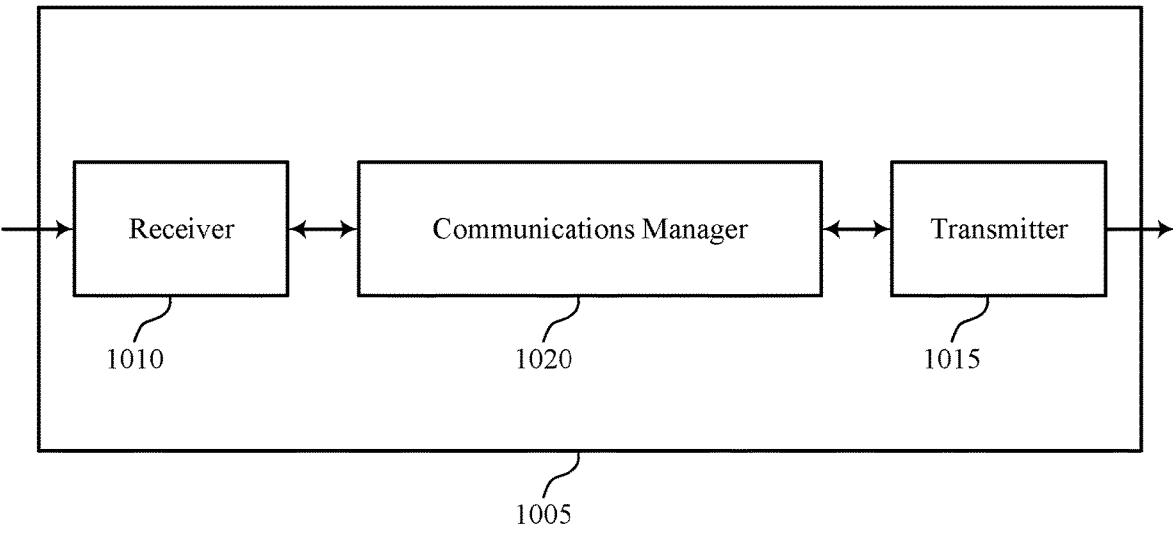
FIGS. 10 and 11 show block diagrams of devices that support multicast scheduling in a full duplex network in accordance with one or more aspects of the present disclosure.

FIG. 10 shows a block diagram 1000 of a device 1005 that supports multicast scheduling in a full duplex network in accordance with one or more aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multicast scheduling in a full duplex network). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multicast scheduling in a full duplex network). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of multicast scheduling in a full duplex network as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a UE in accordance with examples as disclosed herein. For example, the communications manager 1020 may be configured as or otherwise support a means for receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof. The communications manager 1020 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The communications manager 1020 may be configured as or otherwise support a means for receiving, from the network entity, a multicast transmission in the slot via the determined active CFR.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
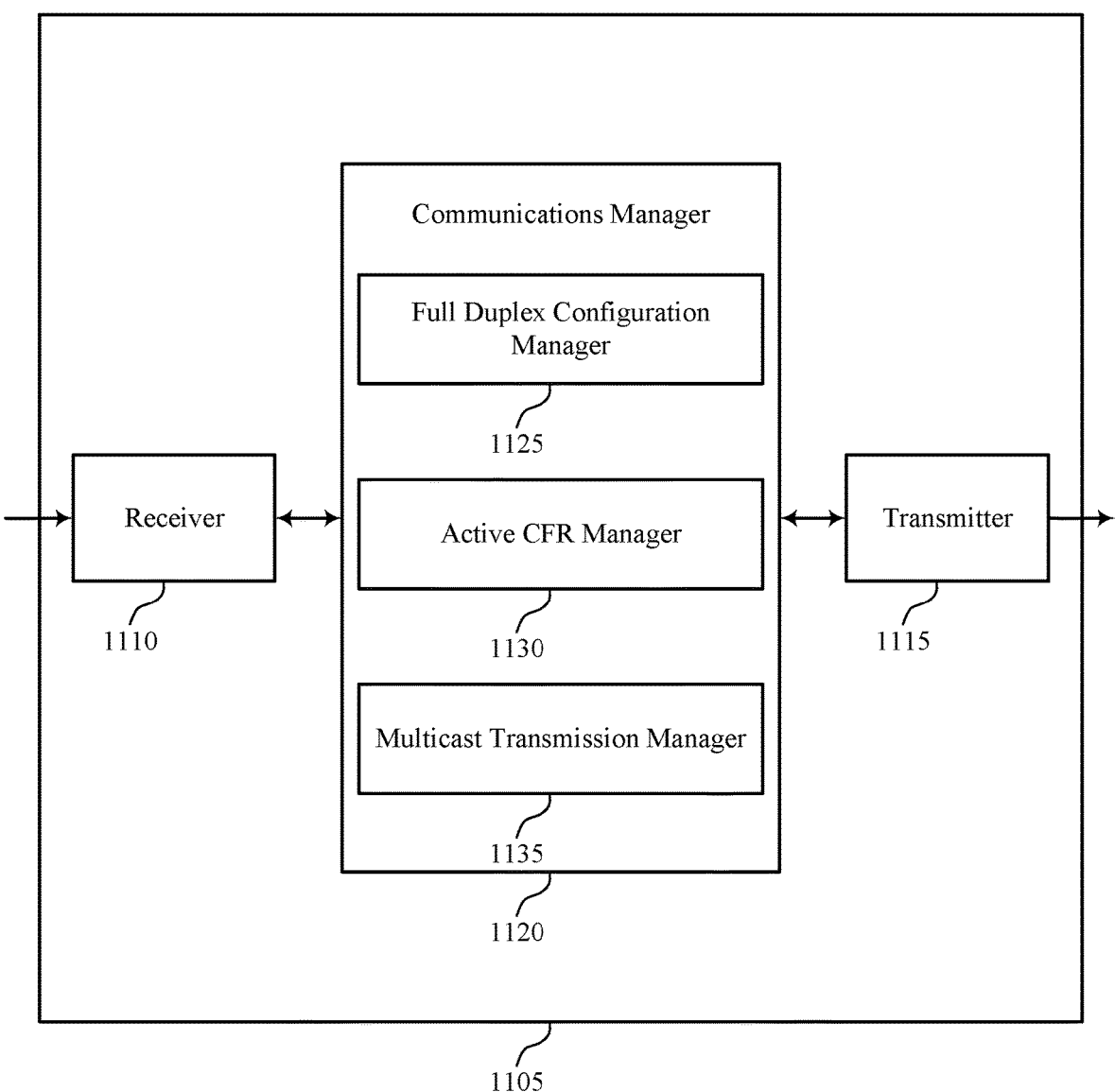

FIG. 11 shows a block diagram 1100 of a device 1105 that supports multicast scheduling in a full duplex network in accordance with one or more aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to multicast scheduling in a full duplex network). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to multicast scheduling in a full duplex network). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of multicast scheduling in a full duplex network as described herein. For example, the communications manager 1120 may include a full duplex configuration manager 1125, an active CFR manager 1130, a multicast transmission manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. The full duplex configuration manager 1125 may be configured as or otherwise support a means for receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof. The active CFR manager 1130 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The multicast transmission manager 1135 may be configured as or otherwise support a means for receiving, from the network entity, a multicast transmission in the slot via the determined active CFR.

Figure 12:
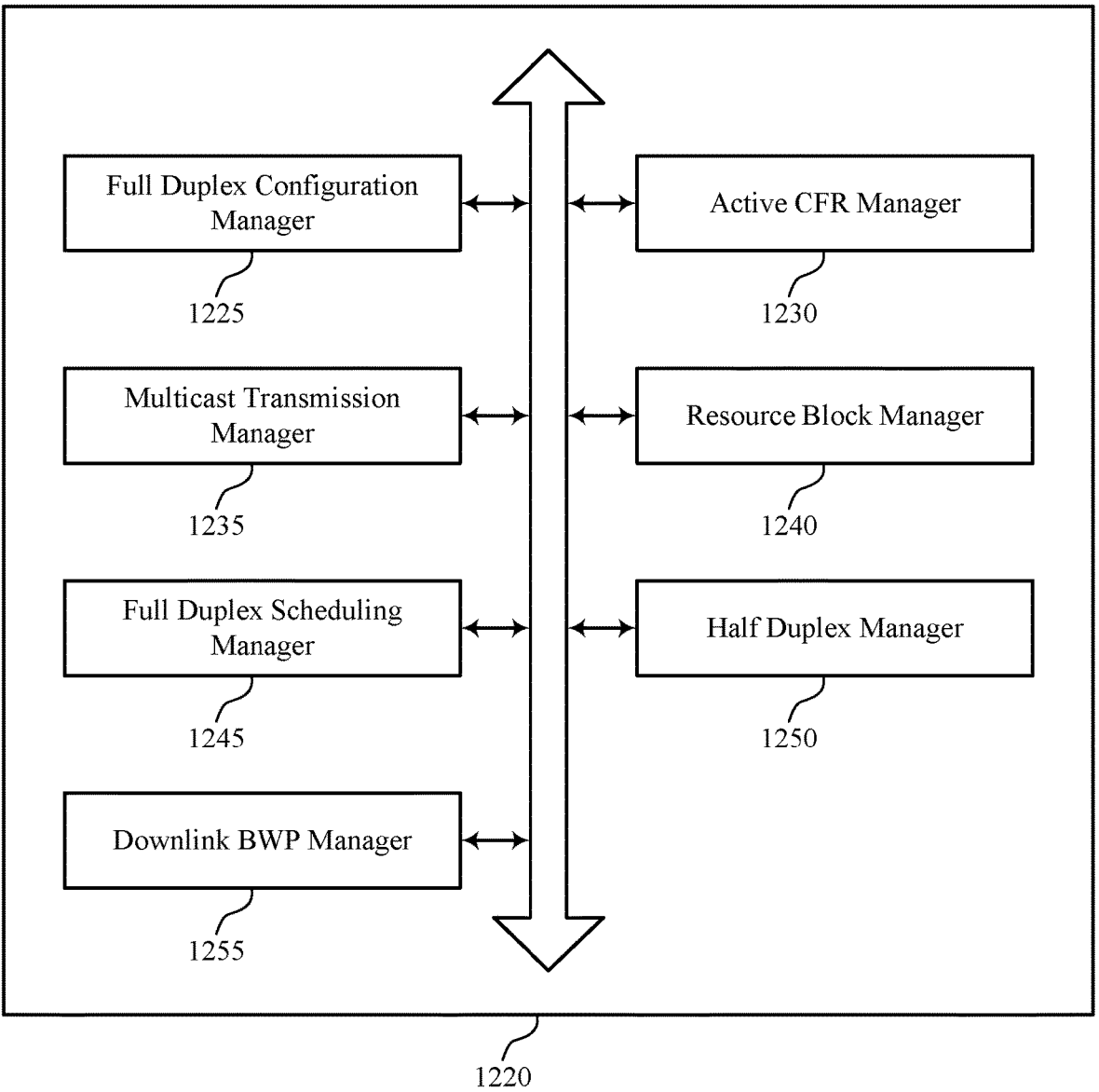
FIG. 12 shows a block diagram of a communications manager that supports multicast scheduling in a full duplex network in accordance with one or more aspects of the present disclosure.

FIG. 12 shows a block diagram 1200 of a communications manager 1220 that supports multicast scheduling in a full duplex network in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of multicast scheduling in a full duplex network as described herein. For example, the communications manager 1220 may include a full duplex configuration manager 1225, an active CFR manager 1230, a multicast transmission manager 1235, a RB manager 1240, a full duplex scheduling manager 1245, a half duplex manager 1250, a downlink BWP manager 1255, or any combination thereof. Each of these components may communicate, directly or indirectly, with one another (e.g., via one or more buses).

The communications manager 1220 may support wireless communications at a UE in accordance with examples as disclosed herein. The full duplex configuration manager 1225 may be configured as or otherwise support a means for receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof. The active CFR manager 1230 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The multicast transmission manager 1235 may be configured as or otherwise support a means for receiving, from the network entity, a multicast transmission in the slot via the determined active CFR.

In some examples, to support receiving the control signaling, the RB manager 1240 may be configured as or otherwise support a means for receiving an indication of a first set of RBs associated with the CFR configuration and an indication of a second set of RBs associated with the downlink BWP, and where determining the active CFR includes determining an overlapping set of RBs between the first set of RBs and the second set of RBs.

In some examples, the full duplex scheduling manager 1245 may be configured as or otherwise support a means for receiving second control signaling scheduling the slot with the full duplex slot type, where the CFR configuration indicates respective CFRs associated with a set of downlink BWPs, the set of downlink BWPs including the downlink BWP, and where determining the active CFR includes determining the respective CFR associated with the downlink BWP.

In some examples, at least one downlink BWP of the set of downlink BWPs includes two non-contiguous subbands. In some examples, the CFR configuration further indicates respective CFRs associated with the two non-contiguous subbands.

In some examples, to support receiving the control signaling, the active CFR manager 1230 may be configured as or otherwise support a means for receiving an indication of a set of communication resources that are unavailable for the active CFR.

In some examples, to support determining the active CFR, the active CFR manager 1230 may be configured as or otherwise support a means for determining, based on a subset of frequency resources of the downlink BWP overlapping with uplink resources, that the active CFR does not include the subset of frequency resources.

In some examples, to support receiving the control signaling, the half duplex manager 1250 may be configured as or otherwise support a means for receiving an indication of a second downlink BWP for a half duplex slot type, where the CFR configuration includes an indication of a first CFR associated with the full duplex slot type and a second CFR associated with the half duplex slot type, where determining the active CFR for the slot includes determining the first CFR based on the slot being the full duplex slot type.

In some examples, the multicast transmission manager 1235 may be configured as or otherwise support a means for receiving, from the network entity, a second multicast transmission in a second slot of the half duplex slot type via the second CFR.

In some examples, the multicast transmission includes one of a group-common downlink control channel message or a group-common downlink shared channel message.

In some examples, to support receiving the control signaling, the downlink BWP manager 1255 may be configured as or otherwise support a means for receiving an indication of a set of RBs associated with the downlink BWP, where the active CFR includes a subset of contiguous RBs of the set of RBs.

Figure 13:
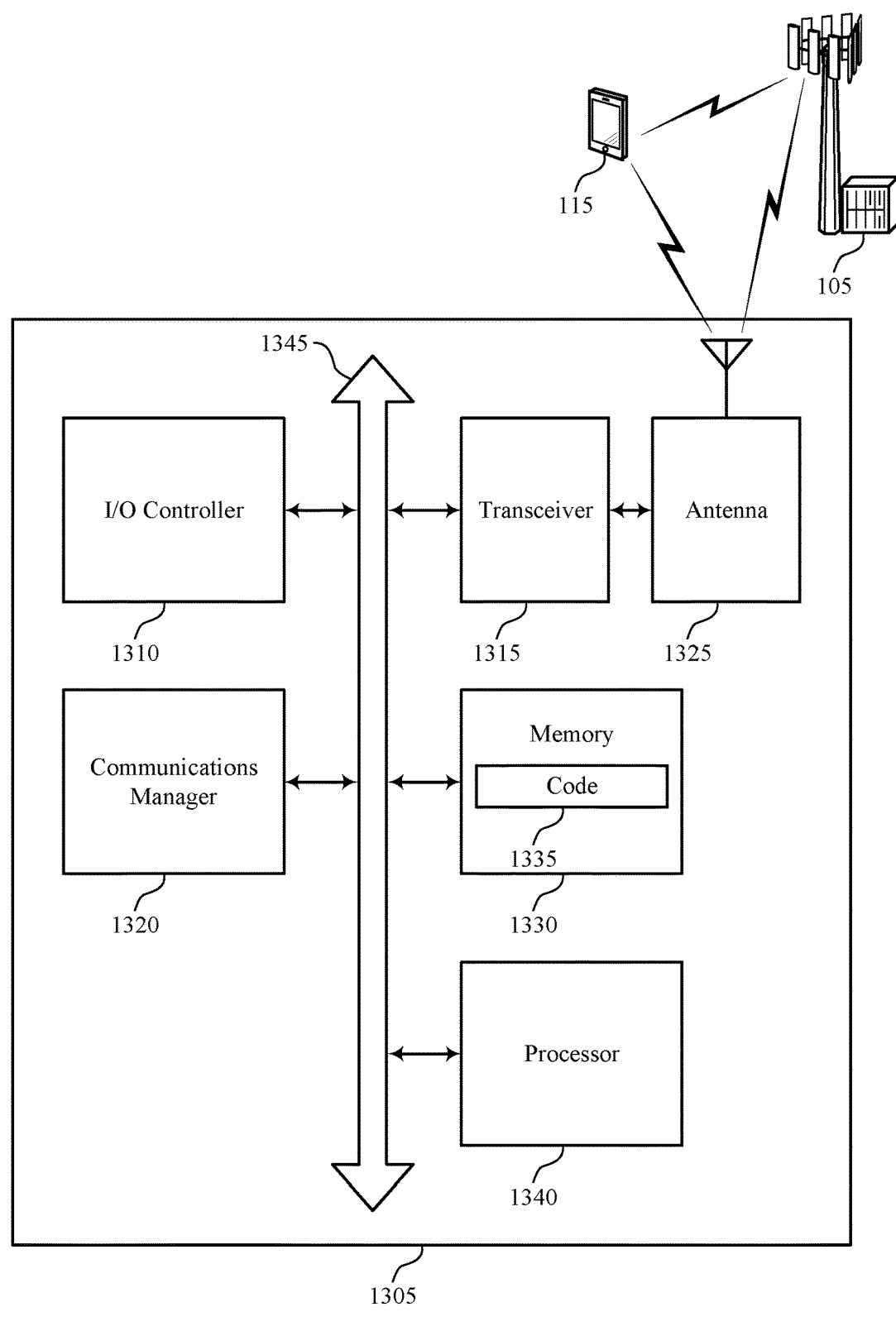
FIG. 13 shows a diagram of a system including a device that supports multicast scheduling in a full duplex network in accordance with one or more aspects of the present disclosure.

FIG. 13 shows a diagram of a system 1300 including a device 1305 that supports multicast scheduling in a full duplex network in accordance with one or more aspects of the present disclosure. The device 1305 may be an example of or include the components of a device 1005, a device 1105, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally, or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting multicast scheduling in a full duplex network). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof. The communications manager 1320 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The communications manager 1320 may be configured as or otherwise support a means for receiving, from the network entity, a multicast transmission in the slot via the determined active CFR.

By including or configuring the communications manager 1320 in accordance with examples as described herein, the device 1305 may support techniques for improved communication reliability, more efficient utilization of communication resources, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of multicast scheduling in a full duplex network as described herein, or the processor 1340 and the memory 1330 may be otherwise configured to perform or support such operations.

Figure 14:
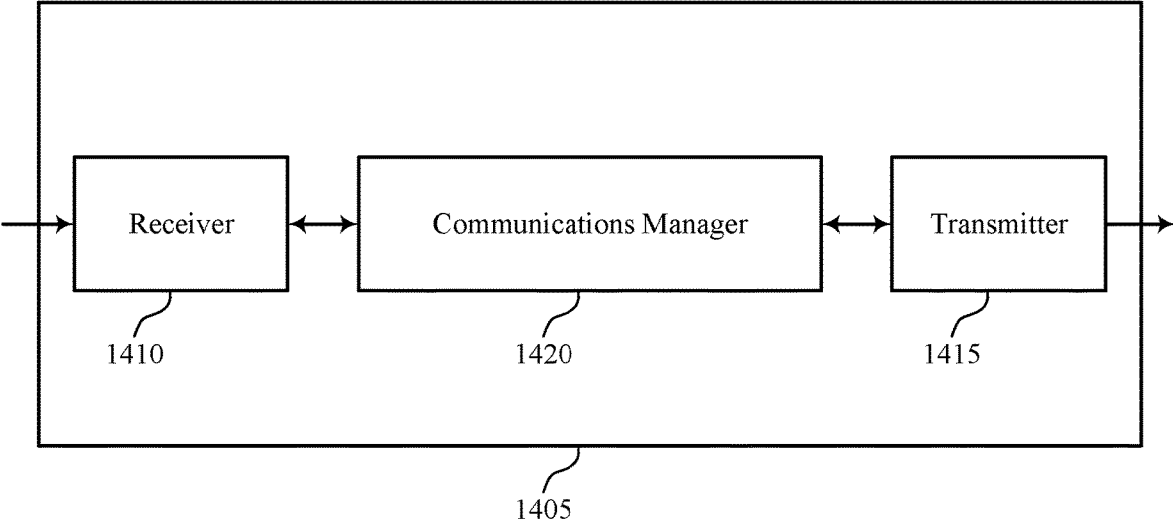
FIGS. 14 and 15 show block diagrams of devices that support multicast scheduling in a full duplex network in accordance with one or more aspects of the present disclosure.

FIG. 14 shows a block diagram 1400 of a device 1405 that supports multicast scheduling in a full duplex network in accordance with one or more aspects of the present disclosure. The device 1405 may be an example of aspects of a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of multicast scheduling in a full duplex network as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communications at a network entity in accordance with examples as disclosed herein. For example, the communications manager 1420 may be configured as or otherwise support a means for outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof. The communications manager 1420 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The communications manager 1420 may be configured as or otherwise support a means for outputting a multicast message to a group of UEs in the slot via the determined active CFR.

By including or configuring the communications manager 1420 in accordance with examples as described herein, the device 1405 (e.g., a processor controlling or otherwise coupled with the receiver 1410, the transmitter 1415, the communications manager 1420, or a combination thereof) may support techniques for more efficient utilization of communication resources.

Figure 15:
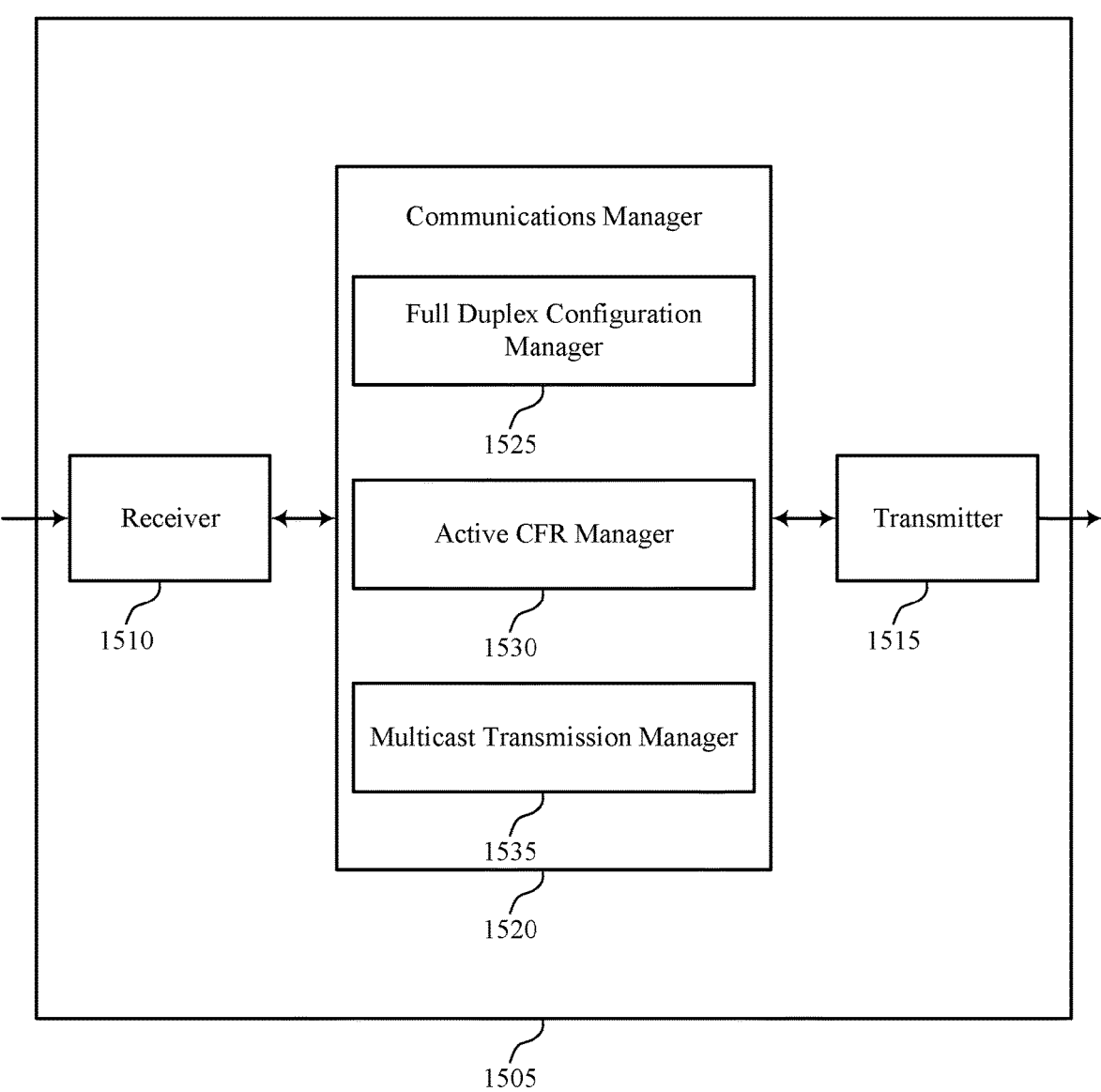

FIG. 15 shows a block diagram 1500 of a device 1505 that supports multicast scheduling in a full duplex network in accordance with one or more aspects of the present disclosure. The device 1505 may be an example of aspects of a device 1405 or a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of multicast scheduling in a full duplex network as described herein. For example, the communications manager 1520 may include a full duplex configuration manager 1525, an active CFR manager 1530, a multicast transmission manager 1535, or any combination thereof. The communications manager 1520 may be an example of aspects of a communications manager 1420 as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communications at a network entity in accordance with examples as disclosed herein. The full duplex configuration manager 1525 may be configured as or otherwise support a means for outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof. The active CFR manager 1530 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The multicast transmission manager 1535 may be configured as or otherwise support a means for outputting a multicast message to a group of UEs in the slot via the determined active CFR.

Figure 16:
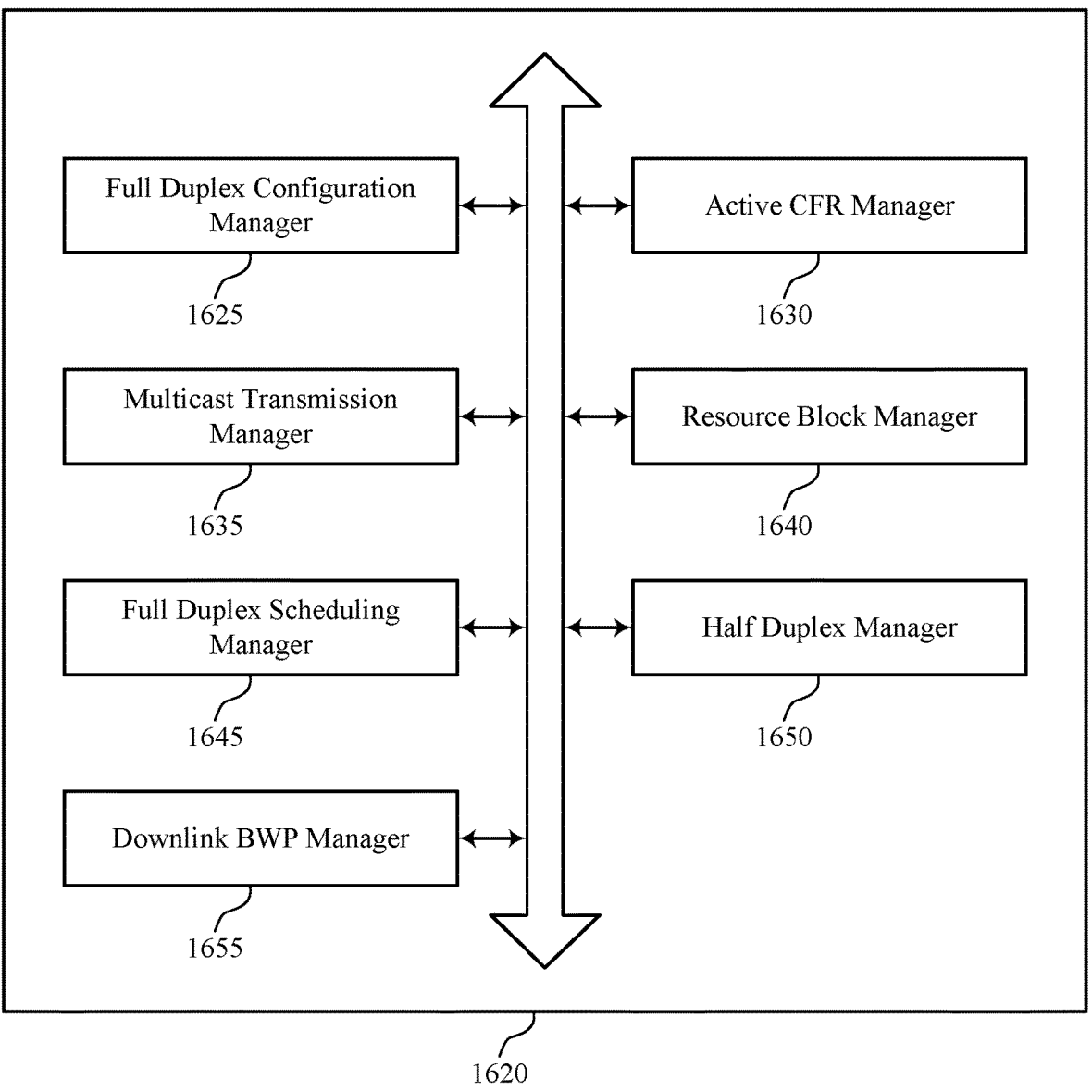
FIG. 16 shows a block diagram of a communications manager that supports multicast scheduling in a full duplex network in accordance with one or more aspects of the present disclosure.

FIG. 16 shows a block diagram 1600 of a communications manager 1620 that supports multicast scheduling in a full duplex network in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of multicast scheduling in a full duplex network as described herein. For example, the communications manager 1620 may include a full duplex configuration manager 1625, an active CFR manager 1630, a multicast transmission manager 1635, a RB manager 1640, a full duplex scheduling manager 1645, a half duplex manager 1650, a downlink BWP manager 1655, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communications at a network entity in accordance with examples as disclosed herein. The full duplex configuration manager 1625 may be configured as or otherwise support a means for outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof. The active CFR manager 1630 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The multicast transmission manager 1635 may be configured as or otherwise support a means for outputting a multicast message to a group of UEs in the slot via the determined active CFR.

In some examples, to support outputting the control signaling, the RB manager 1640 may be configured as or otherwise support a means for outputting an indication of a first set of RBs associated with the CFR configuration and an indication of a second set of RBs associated with the downlink BWP, and where determining the active CFR includes determining an overlapping set of RBs between the first set of RBs and the second set of RBs.

In some examples, the full duplex scheduling manager 1645 may be configured as or otherwise support a means for outputting second control signaling scheduling the slot with the full duplex slot type, where the CFR configuration indicates respective CFRs associated with a set of downlink BWPs, the set of downlink BWPs including the downlink BWP, and where determining the active CFR includes determining the respective CFR associated with the downlink BWP.

In some examples, at least one downlink BWP of the set of downlink BWPs includes two non-contiguous subbands. In some examples, the CFR configuration further indicates respective CFRs associated with the two non-contiguous subbands.

In some examples, to support outputting the control signaling, the active CFR manager 1630 may be configured as or otherwise support a means for outputting an indication of a set of communication resources that are unavailable for the active CFR.

In some examples, to support determining the active CFR, the active CFR manager 1630 may be configured as or otherwise support a means for determining, based on a subset of frequency resources of the downlink BWP overlapping with uplink resources, that the active CFR does not include the subset of frequency resources.

In some examples, to support outputting the control signaling, the half duplex manager 1650 may be configured as or otherwise support a means for outputting an indication of a second downlink BWP for a half duplex slot type, where the CFR configuration includes an indication of a first CFR associated with the full duplex slot type and a second CFR associated with the half duplex slot type, where determining the active CFR for the slot includes determining the first CFR based on the slot being the full duplex slot type.

In some examples, the multicast transmission manager 1635 may be configured as or otherwise support a means for outputting a second multicast transmission to the group of UEs in a second slot of the half duplex slot type via the second CFR.

In some examples, the second multicast transmission includes one of a group-common downlink control channel message or a group-common downlink shared channel message.

In some examples, to support outputting the control signaling, the downlink BWP manager 1655 may be configured as or otherwise support a means for outputting an indication of a set of RBs associated with the downlink BWP, where the active CFR includes a subset of contiguous RBs of the set of RBs.

Figure 17:
FIG. 17 shows a diagram of a system including a device that supports multicast scheduling in a full duplex network in accordance with one or more aspects of the present disclosure.

FIG. 17 shows a diagram of a system 1700 including a device 1705 that supports multicast scheduling in a full duplex network in accordance with one or more aspects of the present disclosure. The device 1705 may be an example of or include the components of a device 1405, a device 1505, or a network entity 105 as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof. In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting multicast scheduling in a full duplex network). For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system. A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components. For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem. Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communications at a network entity in accordance with examples as disclosed herein. For example, the communications manager 1720 may be configured as or otherwise support a means for outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof. The communications manager 1720 may be configured as or otherwise support a means for determining an active CFR for a slot of the full duplex slot type based on the CFR configuration, the uplink BWP, the downlink BWP, the one or more uplink subbands, the one or more downlink subbands, or a combination thereof. The communications manager 1720 may be configured as or otherwise support a means for outputting a multicast message to a group of UEs in the slot via the determined active CFR.

By including or configuring the communications manager 1720 in accordance with examples as described herein, the device 1705 may support techniques for improved communication reliability, more efficient utilization of communication resources, and improved coordination between devices.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of multicast scheduling in a full duplex network as described herein, or the processor 1735 and the memory 1725 may be otherwise configured to perform or support such operations.

FIG. 18 shows a flowchart illustrating a method 1800 that supports multicast scheduling in a full duplex network in accordance with one or more aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof. The operations of 1805 may be performed in accordance with examples as disclosed herein. In some examples, aspects of the operations of 1805 may be performed by a full duplex configuration manager 1225 as described with reference to FIG. 12.

At 1810, the method may include determining an active CFR for a slot of the full duplex slot type based on the CFR configuration, the uplink BWP, the downlink BWP, the one or more uplink subbands, the one or more downlink subbands, or a combination thereof. The operations of 1810 may be performed in accordance with examples as disclosed herein. In some examples, aspects of the operations of 1810 may be performed by an active CFR manager 1230 as described with reference to FIG. 12.

At 1815, the method may include receiving, from the network entity, a multicast transmission in the slot via the determined active CFR. The operations of 1815 may be performed in accordance with examples as disclosed herein. In some examples, aspects of the operations of 1815 may be performed by a multicast transmission manager 1235 as described with reference to FIG. 12.

FIG. 19 shows a flowchart illustrating a method 1900 that supports multicast scheduling in a full duplex network in accordance with one or more aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1905, the method may include receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof. The operations of 1905 may be performed in accordance with examples as disclosed herein. In some examples, aspects of the operations of 1905 may be performed by a full duplex configuration manager 1225 as described with reference to FIG. 12.

At 1910, the method may include determining an active CFR for a slot of the full duplex slot type based on the CFR configuration, the uplink BWP, the downlink BWP, the one or more uplink subbands, the one or more downlink subbands, or a combination thereof. The operations of 1910 may be performed in accordance with examples as disclosed herein. In some examples, aspects of the operations of 1910 may be performed by an active CFR manager 1230 as described with reference to FIG. 12.

At 1915, the method may include receiving, from the network entity, a multicast transmission in the slot via the determined active CFR. The operations of 1915 may be performed in accordance with examples as disclosed herein. In some examples, aspects of the operations of 1915 may be performed by a multicast transmission manager 1235 as described with reference to FIG. 12.

FIG. 20 shows a flowchart illustrating a method 2000 that supports multicast scheduling in a full duplex network in accordance with one or more aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2005, the method may include receiving, from a network entity, control signaling including an indication of a CFR configuration, an indication of an uplink BWP for a full duplex slot type including one or more uplink subbands, an indication of a downlink BWP for the full duplex slot type including one or more downlink subbands, or a combination thereof. The operations of 2005 may be performed in accordance with examples as disclosed herein. In some examples, aspects of the operations of 2005 may be performed by a full duplex configuration manager 1225 as described with reference to FIG. 12.

At 2010, the method may include determining an active CFR for a slot of the full duplex slot type based on the CFR configuration, the uplink BWP, the downlink BWP, the one or more uplink subbands, the one or more downlink subbands, or a combination thereof. The operations of 2010 may be performed in accordance with examples as disclosed herein. In some examples, aspects of the operations of 2010 may be performed by an active CFR manager 1230 as described with reference to FIG. 12.

At 2015, the method may include receiving, from the network entity, a multicast transmission in the slot via the determined active CFR. The operations of 2015 may be performed in accordance with examples as disclosed herein. In some examples, aspects of the operations of 2015 may be performed by a multicast transmission manager 1235 as described with reference to FIG. 12.

At 2020, the method may include receiving an indication of a set of RBs associated with the downlink BWP, where the active CFR includes a subset of contiguous RBs of the set of RBs. The operations of 2020 may be performed in accordance with examples as disclosed herein. In some examples, aspects of the operations of 2020 may be performed by a downlink BWP manager 1255 as described with reference to FIG. 12.

FIG. 21 shows a flowchart illustrating a method 2100 that supports multicast scheduling in a full duplex network in accordance with one or more aspects of the present disclosure. The operations of the method 2100 may be implemented by a network entity or its components as described herein. For example, the operations of the method 2100 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the method may include outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof. The operations of 2105 may be performed in accordance with examples as disclosed herein. In some examples, aspects of the operations of 2105 may be performed by a full duplex configuration manager 1625 as described with reference to FIG. 16.

At 2110, the method may include determining an active CFR for a slot of the full duplex slot type based on the CFR configuration, the uplink BWP, the downlink BWP, the one or more uplink subbands, the one or more downlink subbands, or a combination thereof. The operations of 2110 may be performed in accordance with examples as disclosed herein. In some examples, aspects of the operations of 2110 may be performed by an active CFR manager 1630 as described with reference to FIG. 16.

At 2115, the method may include outputting a multicast message to a group of UEs in the slot via the determined active CFR. The operations of 2115 may be performed in accordance with examples as disclosed herein. In some examples, aspects of the operations of 2115 may be performed by a multicast transmission manager 1635 as described with reference to FIG. 16.

FIG. 22 shows a flowchart illustrating a method 2200 that supports multicast scheduling in a full duplex network in accordance with one or more aspects of the present disclosure. The operations of the method 2200 may be implemented by a network entity or its components as described herein. For example, the operations of the method 2200 may be performed by a network entity as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2205, the method may include outputting control signaling including an indication of a CFR configuration, an indication of an uplink BWP for a full duplex slot type including one or more uplink subbands, and an indication of a downlink BWP for the full duplex slot type including one or more downlink subbands, or a combination thereof. The operations of 2205 may be performed in accordance with examples as disclosed herein. In some examples, aspects of the operations of 2205 may be performed by a full duplex configuration manager 1625 as described with reference to FIG. 16.

At 2210, the method may include determining an active CFR for a slot of the full duplex slot type based on the CFR configuration, the uplink BWP, the downlink BWP, the one or more uplink subbands, the one or more downlink subbands, or a combination thereof. The operations of 2210 may be performed in accordance with examples as disclosed herein. In some examples, aspects of the operations of 2210 may be performed by an active CFR manager 1630 as described with reference to FIG. 16.

At 2215, the method may include outputting a multicast message to a group of UEs in the slot via the determined active CFR. The operations of 2215 may be performed in accordance with examples as disclosed herein. In some examples, aspects of the operations of 2215 may be performed by a multicast transmission manager 1635 as described with reference to FIG. 16.

At 2220, the method may include outputting an indication of a set of RBs associated with the downlink BWP, where the active CFR includes a subset of contiguous RBs of the set of RBs. The operations of 2220 may be performed in accordance with examples as disclosed herein. In some examples, aspects of the operations of 2220 may be performed by a downlink BWP manager 1655 as described with reference to FIG. 16.

The following provides an overview of aspects of the present disclosure:

Aspect 1: A method for wireless communications at a UE, comprising: receiving, from a network entity, control signaling including an indication of a CFR configuration, an indication of an uplink BWP for a full duplex slot type comprising one or more uplink subbands, an indication of a downlink BWP for the full duplex slot type comprising one or more downlink subbands, or a combination thereof; determining an active CFR for a slot of the full duplex slot type based at least in part on the CFR configuration, the uplink BWP, the downlink BWP, the one or more uplink subbands, the one or more downlink subbands, or a combination thereof; and receiving, from the network entity, a multicast transmission in the slot via the determined active CFR.

Aspect 2: The method of aspect 1, wherein receiving the control signaling comprises: receiving an indication of a first set of RBs associated with the CFR configuration and an indication of a second set of RBs associated with the downlink BWP, and wherein determining the active CFR comprises determining an overlapping set of RBs between the first set of RBs and the second set of RBs.

Aspect 3: The method of any of aspects 1 through 2, further comprising: receiving second control signaling scheduling the slot with the full duplex slot type, wherein the CFR configuration indicates respective CFRs associated with a set of downlink BWPs, the set of downlink BWPs including the downlink BWP, and wherein determining the active CFR comprises determining the respective CFR associated with the downlink BWP.

Aspect 4: The method of aspect 3, wherein at least one downlink BWP of the set of downlink BWPs includes two non-contiguous subbands, and the CFR configuration further indicates respective CFRs associated with the two non-contiguous subbands.

Aspect 5: The method of any of aspects 1 through 4, wherein receiving the control signaling comprises: receiving an indication of a set of communication resources that are unavailable for the active CFR.

Aspect 6: The method of any of aspects 1 through 5, wherein determining the active CFR comprises: determining, based on a subset of frequency resources of the downlink BWP overlapping with uplink resources, that the active CFR does not include the subset of frequency resources.

Aspect 7: The method of any of aspects 1 through 6, wherein receiving the control signaling comprises: receiving an indication of a second downlink BWP for a half duplex slot type, and wherein the CFR configuration includes an indication of a first CFR associated with the full duplex slot type and a second CFR associated with the half duplex slot type, wherein determining the active CFR for the slot comprises determining the first CFR based on the slot being the full duplex slot type.

Aspect 8: The method of aspect 7, further comprising: receiving, from the network entity, a second multicast transmission in a second slot of the half duplex slot type via the second CFR.

Aspect 9: The method of any of aspects 1 through 8, wherein the multicast transmission comprises one of a group-common downlink control channel message or a group-common downlink shared channel message.

Aspect 10: The method of any of aspects 1 through 9, wherein receiving the control signaling comprises: receiving an indication of a set of RBs associated with the downlink BWP, wherein the active CFR comprises a subset of contiguous RBs of the set of RB s.

Aspect 11: A method for wireless communications at a network entity, comprising: outputting control signaling including an indication of a CFR configuration, an indication of an uplink BWP for a full duplex slot type comprising one or more uplink subbands, and an indication of a downlink BWP for the full duplex slot type comprising one or more downlink subbands, or a combination thereof; determining an active CFR for a slot of the full duplex slot type based at least in part on the CFR configuration, the uplink BWP, the downlink BWP, the one or more uplink subbands, the one or more downlink subbands, or a combination thereof; and outputting a multicast message to a group of UEs in the slot via the determined active CFR.

Aspect 12: The method of aspect 11, wherein outputting the control signaling comprises: outputting an indication of a first set of RBs associated with the CFR configuration and an indication of a second set of RBs associated with the downlink BWP, and wherein determining the active CFR comprises determining an overlapping set of RBs between the first set of RBs and the second set of RBs.

Aspect 13: The method of any of aspects 11 through 12, further comprising: outputting second control signaling scheduling the slot with the full duplex slot type, wherein the CFR configuration indicates respective CFRs associated with a set of downlink BWPs, the set of downlink BWPs including the downlink BWP, and wherein determining the active CFR comprises determining the respective CFR associated with the downlink BWP.

Aspect 14: The method of aspect 13, wherein at least one downlink BWP of the set of downlink BWPs includes two non-contiguous subbands, and the CFR configuration further indicates respective CFRs associated with the two non-contiguous subbands.

Aspect 15: The method of any of aspects 11 through 14, wherein outputting the control signaling comprises: outputting an indication of a set of communication resources that are unavailable for the active CFR.

Aspect 16: The method of any of aspects 11 through 15, wherein determining the active CFR comprises: determining, based on a subset of frequency resources of the downlink BWP overlapping with uplink resources, that the active CFR does not include the subset of frequency resources.

Aspect 17: The method of any of aspects 11 through 16, wherein outputting the control signaling comprises: outputting an indication of a second downlink BWP for a half duplex slot type, and wherein the CFR configuration includes an indication of a first CFR associated with the full duplex slot type and a second CFR associated with the half duplex slot type, wherein determining the active CFR for the slot comprises determining the first CFR based on the slot being the full duplex slot type.

Aspect 18: The method of aspect 17, further comprising: outputting a second multicast transmission to the group of UEs in a second slot of the half duplex slot type via the second CFR.

Aspect 19: The method of aspect 18, wherein the second multicast transmission comprises one of a group-common downlink control channel message or a group-common downlink shared channel message.

Aspect 20: The method of any of aspects 11 through 19, wherein outputting the control signaling comprises: outputting an indication of a set of RBs associated with the downlink BWP, wherein the active CFR comprises a subset of contiguous RBs of the set of RBs.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus for wireless communications at a network entity, comprising a processor; memory coupled with the processor; and instructions stored in the memory and executable by the processor to cause the apparatus to perform a method of any of aspects 11 through 20.

Aspect 25: An apparatus for wireless communications at a network entity, comprising at least one means for performing a method of any of aspects 11 through 20.

Aspect 26: A non-transitory computer-readable medium storing code for wireless communications at a network entity, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a network entity, control signaling including an indication of a common frequency resource configuration, an indication of an uplink bandwidth part for a full duplex slot type comprising one or more uplink subbands, an indication of a downlink bandwidth part for the full duplex slot type comprising one or more downlink subbands, or a combination thereof;

receiving an indication of a second downlink bandwidth part for a half duplex slot type, wherein the common frequency resource configuration includes an indication of a first common frequency resource associated with the full duplex slot type and a second common frequency resource associated with the half duplex slot type;

determining the first common frequency resource based on the slot being the full duplex slot type;

determining an active common frequency resource for a slot of the full duplex slot type based at least in part on the common frequency resource configuration and one or more of the uplink bandwidth part, the downlink bandwidth part, the one or more uplink subbands, or the one or more downlink subbands, the slot of the full duplex slot type comprising the uplink bandwidth part and the downlink bandwidth part; and receiving, from the network entity, a multicast transmission in the slot of the full duplex slot type via the determined active common frequency resource.

2. The method of claim 1, wherein receiving the control signaling comprises:

receiving an indication of a first set of resource blocks associated with the common frequency resource configuration and an indication of a second set of resource blocks associated with the downlink bandwidth part, and wherein determining the active common frequency resource comprises determining an overlapping set of resource blocks between the first set of resource blocks and the second set of resource blocks.

3. The method of claim 1, further comprising:

receiving second control signaling scheduling the slot with the full duplex slot type, wherein the common frequency resource configuration indicates respective common frequency resources associated with a set of downlink bandwidth parts, the set of downlink bandwidth parts including the downlink bandwidth part, and wherein determining the active common frequency resource comprises determining the respective common frequency resource associated with the downlink bandwidth part.

4. The method of claim 3, wherein:

at least one downlink bandwidth part of the set of downlink bandwidth parts includes two non-contiguous subbands, and the common frequency resource configuration further indicates respective common frequency resources associated with the two non-contiguous subbands.

5. The method of claim 1, wherein receiving the control signaling comprises:

receiving an indication of a set of communication resources that are unavailable for the active common frequency resource.

6. The method of claim 1, wherein determining the active common frequency resource comprises:

determining, based on a subset of frequency resources of the downlink bandwidth part overlapping with uplink resources, that the active common frequency resource does not include the subset of frequency resources.

7. The method of claim 1, further comprising:

receiving, from the network entity, a second multicast transmission in a second slot of the half duplex slot type via the second common frequency resource.

8. The method of claim 1, wherein the multicast transmission comprises one of a group-common downlink control channel message or a group-common downlink shared channel message.

9. The method of claim 1, wherein receiving the control signaling comprises:

receiving an indication of a set of resource blocks associated with the downlink bandwidth part, wherein the active common frequency resource comprises a subset of contiguous resource blocks of the set of resource blocks.

10. A method for wireless communications at a network entity, comprising:

outputting control signaling including an indication of a common frequency resource configuration, an indication of an uplink bandwidth part for a full duplex slot type comprising one or more uplink subbands, and an indication of a downlink bandwidth part for the full duplex slot type comprising one or more downlink subbands, or a combination thereof;

outputting an indication of a second downlink bandwidth part for a half duplex slot type, wherein the common frequency resource configuration includes an indication of a first common frequency resource associated with the full duplex slot type and a second common frequency resource associated with the half duplex slot type;

determining the first common frequency resource based on the slot being the full duplex slot type;

determining an active common frequency resource for a slot of the full duplex slot type based at least in part on the common frequency resource configuration and one or more the uplink bandwidth part, the downlink bandwidth part, the one or more uplink subbands, or the one or more downlink subbands, the slot of the full duplex slot type comprising the uplink bandwidth part and the downlink bandwidth part; and outputting a multicast message to a group of user equipments (UE)s in the slot of the full duplex slot type via the determined active common frequency resource.

11. The method of claim 10, wherein outputting the control signaling comprises:

outputting an indication of a first set of resource blocks associated with the common frequency resource configuration and an indication of a second set of resource blocks associated with the downlink bandwidth part, and wherein determining the active common frequency resource comprises determining an overlapping set of resource blocks between the first set of resource blocks and the second set of resource blocks.

12. The method of claim 10, further comprising:

outputting second control signaling scheduling the slot with the full duplex slot type, wherein the common frequency resource configuration indicates respective common frequency resources associated with a set of downlink bandwidth parts, the set of downlink bandwidth parts including the downlink bandwidth part, and wherein determining the active common frequency resource comprises determining the respective common frequency resource associated with the downlink bandwidth part.

13. The method of claim 12, wherein:

at least one downlink bandwidth part of the set of downlink bandwidth parts includes two non-contiguous subbands, and the common frequency resource configuration further indicates respective common frequency resources associated with the two non-contiguous subbands.

14. The method of claim 10, wherein outputting the control signaling comprises:

outputting an indication of a set of communication resources that are unavailable for the active common frequency resource.

15. The method of claim 10, wherein determining the active common frequency resource comprises:

determining, based on a subset of frequency resources of the downlink bandwidth part overlapping with uplink resources, that the active common frequency resource does not include the subset of frequency resources.

16. The method of claim 10, further comprising:

outputting a second multicast transmission to the group of UEs in a second slot of the half duplex slot type via the second common frequency resource.

17. The method of claim 16, wherein the second multicast transmission comprises one of a group-common downlink control channel message or a group-common downlink shared channel message.

18. The method of claim 10, wherein outputting the control signaling comprises:

outputting an indication of a set of resource blocks associated with the downlink bandwidth part, wherein the active common frequency resource comprises a subset of contiguous resource blocks of the set of resource blocks.

19. An apparatus for wireless communications at a user equipment (UE), comprising:

one or more processors;

one or more memories coupled with the one or more processors; and instructions stored in the one or more memories and executable by the one or more processors to cause the apparatus to:

receive, from a network entity, control signaling including an indication of a common frequency resource configuration, an indication of an uplink bandwidth part for a full duplex slot type comprising one or more uplink subbands, an indication of a downlink bandwidth part for the full duplex slot type comprising one or more downlink subbands, or a combination thereof;

receive an indication of a second downlink bandwidth part for a half duplex slot type, wherein the common frequency resource configuration includes an indication of a first common frequency resource associated with the full duplex slot type and a second common frequency resource associated with the half duplex slot type;

determine the first common frequency resource based on the slot being the full duplex slot type;

determine an active common frequency resource for a slot of the full duplex slot type based at least in part on the common frequency resource configuration and one or more of the uplink bandwidth part, the downlink bandwidth part, the one or more uplink subbands, or the one or more downlink subbands, the slot of the full duplex slot type comprising the uplink bandwidth part and the downlink bandwidth part; and receive, from the network entity, a multicast transmission in the slot of the full duplex slot type via the determined active common frequency resource.

20. The apparatus of claim 19, wherein the instructions to receive the control signaling are executable by the one or more processors to cause the apparatus to:

receive an indication of a first set of resource blocks associated with the common frequency resource configuration and an indication of a second set of resource blocks associated with the downlink bandwidth part, and wherein determining the active common frequency resource comprises determining an overlapping set of resource blocks between the first set of resource blocks and the second set of resource blocks.

21. The apparatus of claim 19, wherein the instructions are further executable by the one or more processors to cause the apparatus to:

receive second control signaling scheduling the slot with the full duplex slot type, wherein the common frequency resource configuration indicates respective common frequency resources associated with a set of downlink bandwidth parts, the set of downlink bandwidth parts including the downlink bandwidth part, and wherein determining the active common frequency resource comprises determining the respective common frequency resource associated with the downlink bandwidth part.

22. The apparatus of claim 21, wherein:

at least one downlink bandwidth part of the set of downlink bandwidth parts includes two non-contiguous subbands, and the common frequency resource configuration further indicates respective common frequency resources associated with the two non-contiguous subbands.

23. The apparatus of claim 19, wherein the instructions to receive the control signaling are executable by the one or more processors to cause the apparatus to:

receive an indication of a set of communication resources that are unavailable for the active common frequency resource.

24. The apparatus of claim 19, wherein the instructions to determine the active common frequency resource are executable by the one or more processors to cause the apparatus to:

determine, based on a subset of frequency resources of the downlink bandwidth part overlapping with uplink resources, that the active common frequency resource does not include the subset of frequency resources.

25. The apparatus of claim 19, wherein the instructions are further executable by the one or more processors to cause the apparatus to:

receive, from the network entity, a second multicast transmission in a second slot of the half duplex slot type via the second common frequency resource.

26. The apparatus of claim 19, wherein the multicast transmission comprises one of a group-common downlink control channel message or a group-common downlink shared channel message.

27. An apparatus for wireless communications at a network entity, comprising:

one or more processors;

one or more memories coupled with the one or more processors; and instructions stored in the one or more memories and executable by the one or more processors to cause the apparatus to:

output control signaling including an indication of a common frequency resource configuration, an indication of an uplink bandwidth part for a full duplex slot type comprising one or more uplink subbands, and an indication of a downlink bandwidth part for the full duplex slot type comprising one or more downlink subbands, or a combination thereof;

output an indication of a second downlink bandwidth part for a half duplex slot type, wherein the common frequency resource configuration includes an indication of a first common frequency resource associated with the full duplex slot type and a second common frequency resource associated with the half duplex slot type;

determine the first common frequency resource based on the slot being the full duplex slot type;

determine an active common frequency resource for a slot of the full duplex slot type based at least in part on the common frequency resource configuration and one or more of the uplink bandwidth part, the downlink bandwidth part, the one or more uplink subbands, or the one or more downlink subbands, the slot of the full duplex slot type comprising the uplink bandwidth part and the downlink bandwidth part; and output a multicast message to a group of user equipments (UE)s in the slot of the full duplex slot type via the determined active common frequency resource.

* * * * *